United States Patent [19]
Grada et al.

[11] 3,719,920
[45] March 6, 1973

[54] METHOD AND APPARATUS FOR DISPLAYING AND/OR RECORDING MEASURED VALUES

[75] Inventors: Walter Grada; Heinz Purnhagen, both of Bremen, Germany; Günter Schnell, Struer, Denmark; Wolfgang Stedtnitz, Neukrug, Germany

[73] Assignee: Fried Krupp Gesellschaft mit beschraenkter Haftung, Essen, Germany

[22] Filed: May 18, 1971

[21] Appl. No.: 144,539

[30] Foreign Application Priority Data

May 25, 1970 Germany..................P 20 25 405.1

[52] U.S. Cl..................................340/3 R, 343/5 DP
[51] Int. Cl....................................................G01s 9/68
[58] Field of Search........340/1 R, 3 C, 3 F, 1 C, 3 R, 340/5 R; 343/5 DP, 7 A

[56] References Cited

UNITED STATES PATENTS 3,437,986  4/1969  Noble....................................340/3 R
3,523,276  8/1970  Kietz......................................340/3 R Primary Examiner—Richard A. Farley
Attorney—Spencer & Kaye

[57] ABSTRACT

A method and apparatus for compiling, evaluating and displaying measured values which are dependent on a given independent variable obtained during a measuring period within a sequence of measuring periods whereby the display may take place at a time and location other than when the measured values are obtained and at a speed independent of the measuring speed. The measured values are, preferably after quantizing, stored in a memory with an identifying or address indication for each value and the information is read out for display, starting at any point in time with respect to the measuring period, by correlating the identifying or address indication with a location indication for the display mechanism so as to synchronize the timing read out of a particular measurement with the display location associated with such measurement.

82 Claims, 11 Drawing Figures

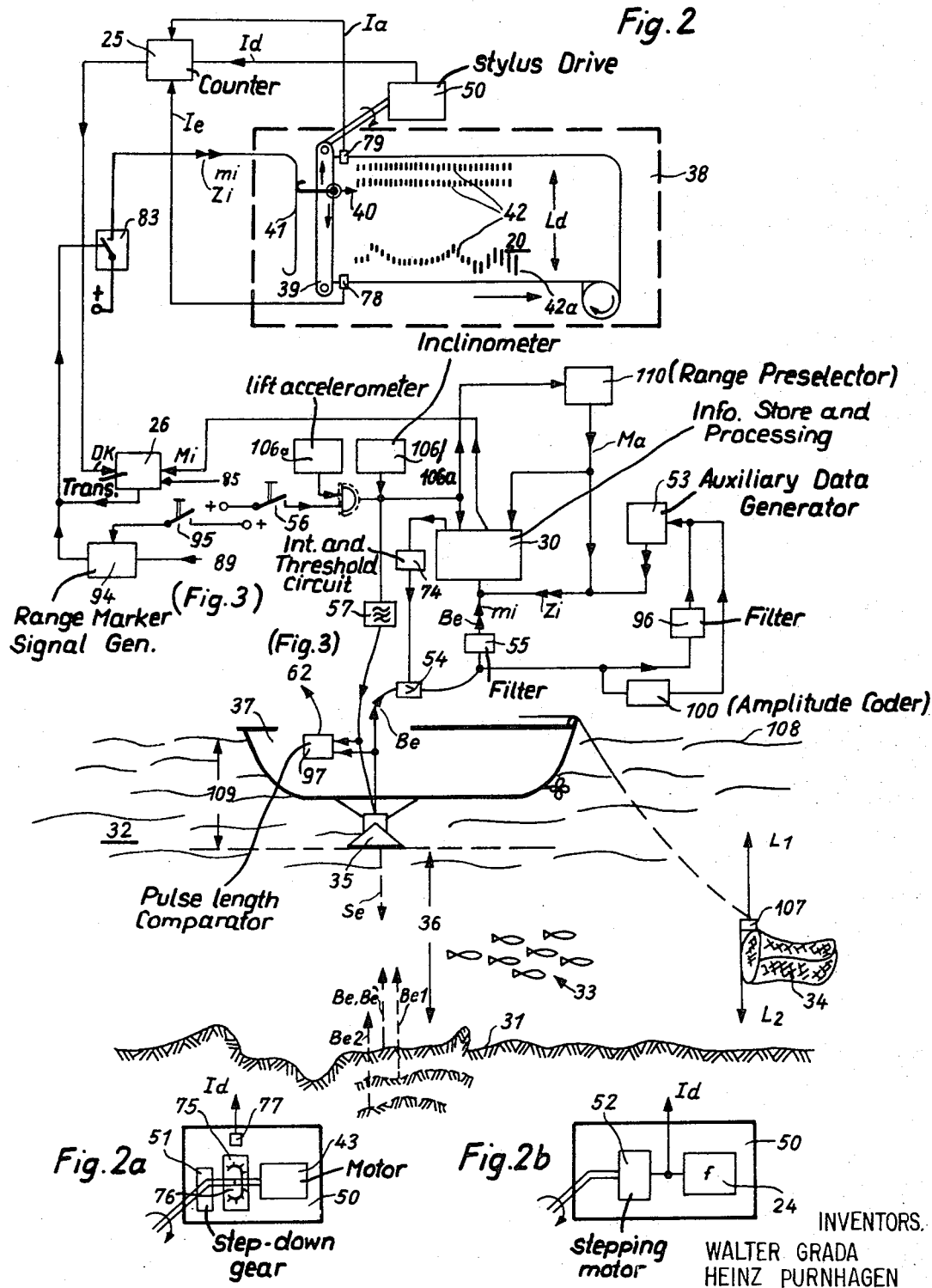

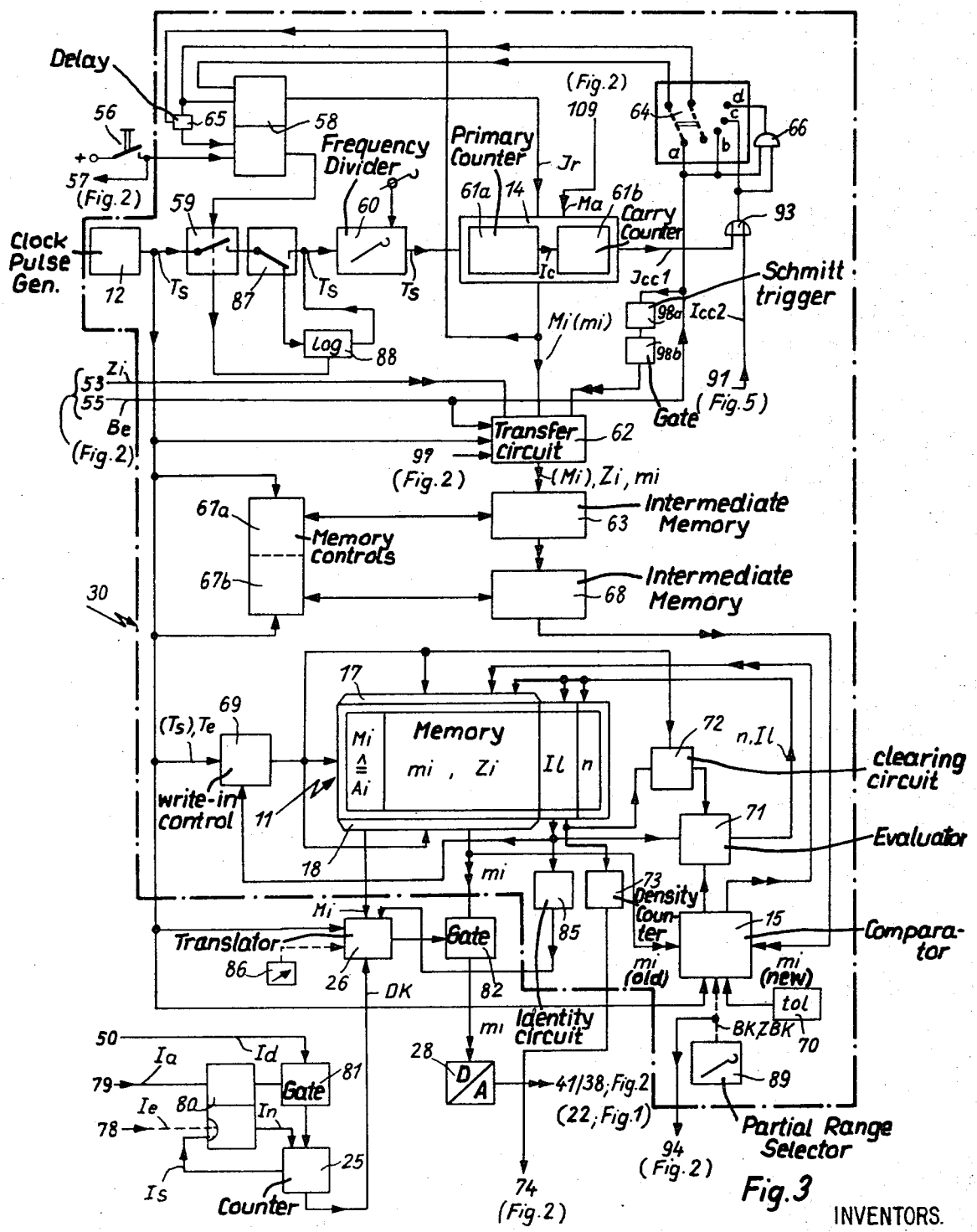

Fig. 4a

| ZBK | BK | TB | $2^0$ | $2^1$ | $2^2$ | $2^3$ | $2^4$ | $2^5$ | $2^6$ | $2^7$ | $2^8$ | 0.5m $2^9$ | 1m | 2m $I_c$ | $2^{10}$ | $2^{11}$ | $2^{12}$ | $I_{cc1}$ $2^{13}$ |
|---|---|---|---|---|---|---|---|---|---|---|---|---|---|---|---|---|---|---|
| x | | 1 | 0-2 | x | | | | | | | x | 0 | | | 0 | 0 | 0 | 0 |
| ↕2 | * | 2 | 2-4 | | x | | | | | | | 1 | | | | | | |
| | * | 3 | 4-6 | | | x | | | | | | 0 | → | | 1 | | | |
| ↕4 | * | 4 | 6-8 | | | | x | | | | | 1 | | | 1 | | | |
| | * | 5 | 8-10 | | | | | x | | | | 0 | → | | 0 | 1 | 0 | |
| ↕6 | * | 6 | 10-12 | | | | | | x | | | 1 | | | 0 | 1 | 0 | |
| | * | 7 | 12-14 | | | | | | | x | | 0 | → | | 1 | 1 | | |
| Lm ↕8 | * | 8 | 14-16 | | | | | | | x | | 1 | | | 1 | 1 | | |
| | * | 9 | 16-18 | | | | | | | | x | 0 | → | | | 1 | | |
| ↕10 | * | 10 | 18-20 | | | | | | | | x | 1 | | | | 1 | | |
| | * | 11 | 20-22 | | | | | | | | x | 0 | → | | 1 | 1 | | |
| ↕12 | * | 12 | 22-24 | | | | | | | x | | 1 | | | 1 | | | |
| | * | 13 | 24-26 | | | | | | x | | | 0 | → | | 1 | 1 | | |
| ↕14 | * | 14 | 26-28 | | | | | x | | | | 1 | | | 1 | 1 | | |
| | * | 15 | 28-30 | | | | x | | | | | 0 | → | | 1 | 1 | 1 | |
| | | | 30-32 | | | x | | | | | | 1 | | | 1 | 1 | 1 | |
| | | | | 0 | 0 | 0 | 0 | 0 | 0 | 0 | 0 | 0 | 0 | → | 0 | 0 | 0 | 1 |

Partial Ranges 61a — 61b — 93 sections

Intermediate sections

"x" = "1" or "0" as desired $I_{cc1}$ 14 (or 63 / 68)

Fig. 4b

BK = 5 ≙ 8-12m $$\begin{array}{c|cccc} & 2^0 & 2^1 & 2^2 & 2^3 \\ 5 \;\hat{=} & 1 & 0 & 1 & 0 \\ \bar{5} \;\hat{=} & 0 & 1 & 0 & 1 \end{array}$$
90

BK = 5 { TB: 8-10 ≙

$$\begin{array}{cccc} 2^9 & 2^{10} & 2^{11} & 2^{12} \\ 0 & 0 & 1 & 0 \end{array}$$

TB: 10-12 ≙

$$\begin{array}{cccc} 1 & 0 & 1 & 0 \end{array}$$
61a-61b $\Sigma_T$ 91

$\Sigma_1 \Sigma_2 \Sigma_3 \Sigma_4 C$
0 1 1 1 0 → 92

$$\begin{array}{c|cccc} & 2^0 & 2^1 & 2^2 & 2^3 \\ \bar{5} \;\hat{=} & 0 & 1 & 0 & 1 \end{array}$$
90

$\Sigma_1 \Sigma_2 \Sigma_3 \Sigma_4 C$
1 1 1 1 0 → 92 ≙ BK = 5

TB: 12-14 ≙

$$\begin{array}{cccc} 2^9 & 2^{10} & 2^{11} & 2^{12} \\ 0 & 1 & 1 & 0 \end{array}$$
61a-61b $$\begin{array}{cccc} 2^0 & 2^1 & 2^2 & 2^3 \\ 0 & 1 & 0 & 1 \end{array}$$
$\bar{5}$ ≙
90

$\Sigma_T$ 91

$\Sigma_1 \Sigma_2 \Sigma_3 \Sigma_4 C$
0 0 0 0 1
92 $I_{cc2}$ → 93 ≙ BK ≠ 5

INVENTORS:
WALTER GRADA
HEINZ PURNHAGEN
GÜNTER SCHNELL
WOLFGANG STEDTNITZ

BY *Spencer & Kaye*
ATTORNEYS.

METHOD AND APPARATUS FOR DISPLAYING AND/OR RECORDING MEASURED VALUES

BACKGROUND OF THE INVENTION

The present invention relates to a method for compiling, evaluating, measured values obtained during a measuring period within a sequence of measuring periods and dependent upon a given independent value and for displaying and/or recording same preferably in the form of a columnar arrangement with the display and/or recording, if required, taking place at a location and time other than where the information was obtained, and if required, with the simultaneous offering of additional information of a physical type different from that of the measured values. The present invention moreover relates to apparatus for performing this method.

In the measuring art and in the data processing art numerous methods and appropriately designed systems are known for determining, possibly converting and otherwise processing values which are stored in intermediate stores and finally displayed and/or recorded. For example, such systems may utilize digital or analog memories, particularly for the intermediate storage, before a further evaluation, perhaps by means of computer controlled drafting apparatus. Less expensive regarding the required apparatus are systems utilizing a graphic display, and perhaps storage of measured values determined over an independent variable on a cathode-ray tube screen or in the form of curves on a dot or a line printer. A special variation of the latter, known particularly from the echo sounding art, is the echograph which produces a continuous diagram and which — similar to conditions in television picture transmission via radio channels or facsimile transmission — produces markings in columns on a recording strip. In such recordings, the information corresponding to the respective measured value may be contained, in addition to its location in the respective column and the position of the column itself, in the intensity of the markings along each column.

The present invention is initially based on the realization that the conventional rigid coupling existing between the sequence of the measured value registration and the sequence of the measured value processing and display or recording in such conventional recording devices constitutes an unnecessary limitation on the degrees of freedom for the evaluation of the information. The invention is based on the further realization that in order to concentrate on the data actually of interest at a given moment — be they certain measured values from a sequence of measured values, the entire sequence of measured values within a selected partial section of the measuring range, the switching of the measuring range or an association between measured values and other informations, variations between linear and nonlinear scales or the like — this rigid coupling would have to be eliminated. However, in order to provide a satisfactory solution to the problem of eliminating this rigid coupling, consideration has to be given to the fact that the solution would have to be a method and/or an apparatus for performing this method, which could be freely adapted — with the least amount of circuitry or an amount of circuitry which would be justifiable in each particular case, and which would meet the special technical requirements of each case — to the actual measuring problem and which could furthermore be operated in conjunction with the above-mentioned known and in many cases proven recording devices.

SUMMARY OF THE INVENTION

This is accomplished according to the present invention with a method of the above-mentioned type in which a measuring period and the process of displaying and/or recording (hereinafter uniformly called the display period) occur independent of one another. The independent variable of the measuring period is quantized and a position identifying value assigned to the resulting measuring sections and a given display range, for example the length of the columns transverse to the longitudinal direction of a recording strip, is quantized and a location value associated to the resulting display sections. The quantized measured values of the measuring periods, which had been started at a point which is arbitrary with respect to the momentary conditions of the display period, — if required, after selection according to given criteria and with the use of characteristic quality denominators for each newly stored information as well as for the previously stored information (quantized measured value and if required additional information) — are written into a memory circuit, utilizing the position indicating values as address parameters. Finally during a display period which has been arbitrarily started with respect to the momentary conditions of the measuring period, the information momentarily stored in the memory circuit, and which is possibly provided with a given quality criterion, is consecutively read out for each location value which is unequivocally associated with each position indicating or address value and displayed, for example by means of recording in columns on a recording strip. The reading out of the information takes place with a preferably constant but variable read-out pulse frequency which is of a preferably substantially smaller order of magnitude than the previously employed freely variable write-in pulse frequency.

It is known in principle from the measuring and data art to save on memory or transmission means requirements with respect to the information to be evaluated by processing the information signals to provide a suitable data reduction even before the signals are stored. It is also known, for example, from the tape storage art, to influence the relative movement between the magnetic head and the storage tape by moving the magnetic head (e.g., a rotating magnetic head in video tape recorders, or a displaceable magnetic head, for example, during the accompaniment of solo performers by means of recorded orchestral music) and to thus possibly vary within certain limits the time association between the write-in and the read-out process. However, the above mentioned combination according to the present invention of known individual features within the scope of the problems at hand leads to a freedom of movement between measured value determination and measured value reproduction which has heretofore not been possible in the art in that an apparatus for performing the method of the invention which considers the given condition as to what type of information is to be written into the memory circuit is simply connected between the arrangement for compiling the measured values and the arrangement for reproducing them.

It is now a significant feature with respect to the possibilities of application for this method that, because of the decoupling between measured value determination and reproduction the writing into the memory circuit can occur at a timing which is entirely independent of that used for reading out of the memory circuit with respect to frequency and synchronization. This also makes the recording of the measured values and their evaluation entirely independent of one another. This property is of particular interest when, for example, the measured values are recorded with electronic means but are played back with mechanical means, which is the case, for example, for the paper recording of a facsimile transmission or of an echogram, or — generally — when the graphic display is to be presented with electromechanical means, such as an echograph, for the typical course of a process which has previously taken place several times but always for very short and perhaps not always strictly identical intervals, and is to be expanded over a wide range but must nevertheless adhere to the finite, given speeds of movement of the mechanical members of the recording device. The method according to the present invention provides further considerable advantages when it is intended to provide continuous and discontinuous evaluation of the measured values in parallel, e.g. the display on an echograph and storage of the informations on punched tapes.

With the present state of the electronic computer art and particularly in view of the universal use of process computers in industry it would be possible, in principle, to have the above-mentioned typical applications of the present invention, as well as those to be described in detail later on, performed by such computer systems by providing them with the appropriate programming. However, the amount of apparatus required for this purpose would be greatly larger and beyond comparison with that required for apparatus for accomplishing the method of the present invention, in addition to the fact that in the typical cases of application to be discussed below the use of complete computer systems would usually be prohibitive for other reasons, such as economical considerations.

Regarding the required circuitry and regarding the possibilities for information processing, the use of the method according to the present invention or of the apparatus for performing this method, respectively, quite substantially increases the freedom of movement with comparatively permissible increased expenditures for the processing of the measured values, since the write-in timing and read-out timing of the memory circuit are now practically independent of one another, so that their start, inter alia, can be triggered independent of one another. Particularly favorable effects can be produced if, as will be discussed in detail in connection with certain embodiments, write-in timing and read-out timing are temporarily or continuously oppositely directed or exhibit a relationship which can be varied during operation.

Interesting technical and economical possibilities are also provided by this invention for the entire field of the data transmission art where, according to another feature of the invention, the information is compressed to its significant contents according to given criteria, such as regarding a comparison of consecutive similar informations with one another. Thus in the line-by-line transmission of pictures over radio channels or in the facsimile transmission, a new measured value with the associated address which indicates the respective point of recording need be written into the memory circuit for adjacent sections of each column and/or at comparable sections of adjacent columns only when the degree of blackening or some other criterion substantially changes with respect to the information already at hand, and consequently only such a measured value requires an additional storage location in the memory. All the other picture regions in which no change has taken place compared to the previous states furnish no new measured values so that the information transmission can be limited to a relatively small number of criteria which actually have an information content. For purposes of reconstruction at the receiving end the unchanged, old (already present in the memory) informations are combined with the changed new informations with the aid of an unequivocal given address scheme which constitutes another feature of the invention.

A useful application of this solution in the sounding art leads to novel and promising possibilities for the suppression or cancellation of permanent echoes by simple circuit means. This problem has thus far been solved generally only at great expense, for example with criteria depending on the relative speed, i.e. by means of evaluation of the Doppler effect, since for purposes of commercial navigation a computer of the type employed by flight monitoring centers can generally not be seriously considered for economic reasons. The possibilities offered by the present invention are of particular interest for the deep-sea fishing industry in which the use of the present invention in conjunction with known fish sounding systems leads to the suppression of the relatively uniformly reoccurring bottom echo in comparison with the weak and continuously changing fish echo which, however, is the echo of interest.

With just as much advantage the present invention can solve the reversed technical problem, i.e. the suppression of all measured values having accidental characteristics, by a comparison of two or a plurality of consecutive comparable measured values. In the picture transmission art, and also in the panorama or partial panorama display in the sounding art, noise influences or sporadic erroneous measurements can thus be eliminated from the final signal processed for display resulting in a recording of the information actually of interest in sharp outlines and without interruptions. Moreover such a recording can now be obtained without correlation processes which require a large amount of circuitry or other signal influences on the processing of the measured values. An appropriate case of application in the field of hydrographic surveying will be described in detail below. Here, and in other cases, substantial automatization previously failed in practice, inter alia, because the required measures for sufficient suppression of the multitude of occurring interferences became too expensive when compared to the total installation. The present invention also places a practicable solution of this problem into a substantially more approachable range.

The method according to the present invention has particular significance in its practical application with the relatively new technique of forming monolithic ring-type closed shift registers since such shift registers can be employed in the apparatus for performing this method as economical and unproblematical memory circuits whose capacity can be dimensioned practically at will.

Numerous other developments and modifications of the basic concept of the present invention which result in effects which thus far could not be realized at all or could be realized only with substantially much greater expenditures can be employed in other fields than those specifically mentioned above. Only a few of the most interesting examples will be discussed in detail below within the description of a drawing, the present invention first being discussed with the aid of a basic data flow diagram. The apparatus embodiments for performing this method which then follow relate first of all to applications in connection with the sounding art and particularly the echo sounding art without the selection of the embodiments here specifically presented being considered to constitute a limitation of the present invention to these particular cases of application.

BRIEF DESCRIPTION OF THE DRAWINGS

FIG. 2 is a block circuit diagram showing a concrete embodiment for the application of the method of the present invention in conjunction with echo sounding in the measuring of depths of bodies of water and in the fishing industry where a towed net is employed.

FIG. 2a is a schematic diagram of one possible embodiment of the drive mechanism for the recording device of FIG. 2.

FIG. 2b is a schematic diagram of an alternative embodiment of the drive mechanism for the recorder of FIG. 2.

FIG. 3 is a detailed block circuit diagram of the information processing arrangement comprising a memory circuit in conjunction with peripheral devices, for the embodiment of FIG. 2.

FIG. 4a is an example in the form of a table illustrating the separation of the display into partial sections.

FIG. 4b is a numerical example for the area control in dependence on the measured values with a division according to FIG. 4a.

DESCRIPTION OF THE PREFERRED EMBODIMENTS

Figure 1:
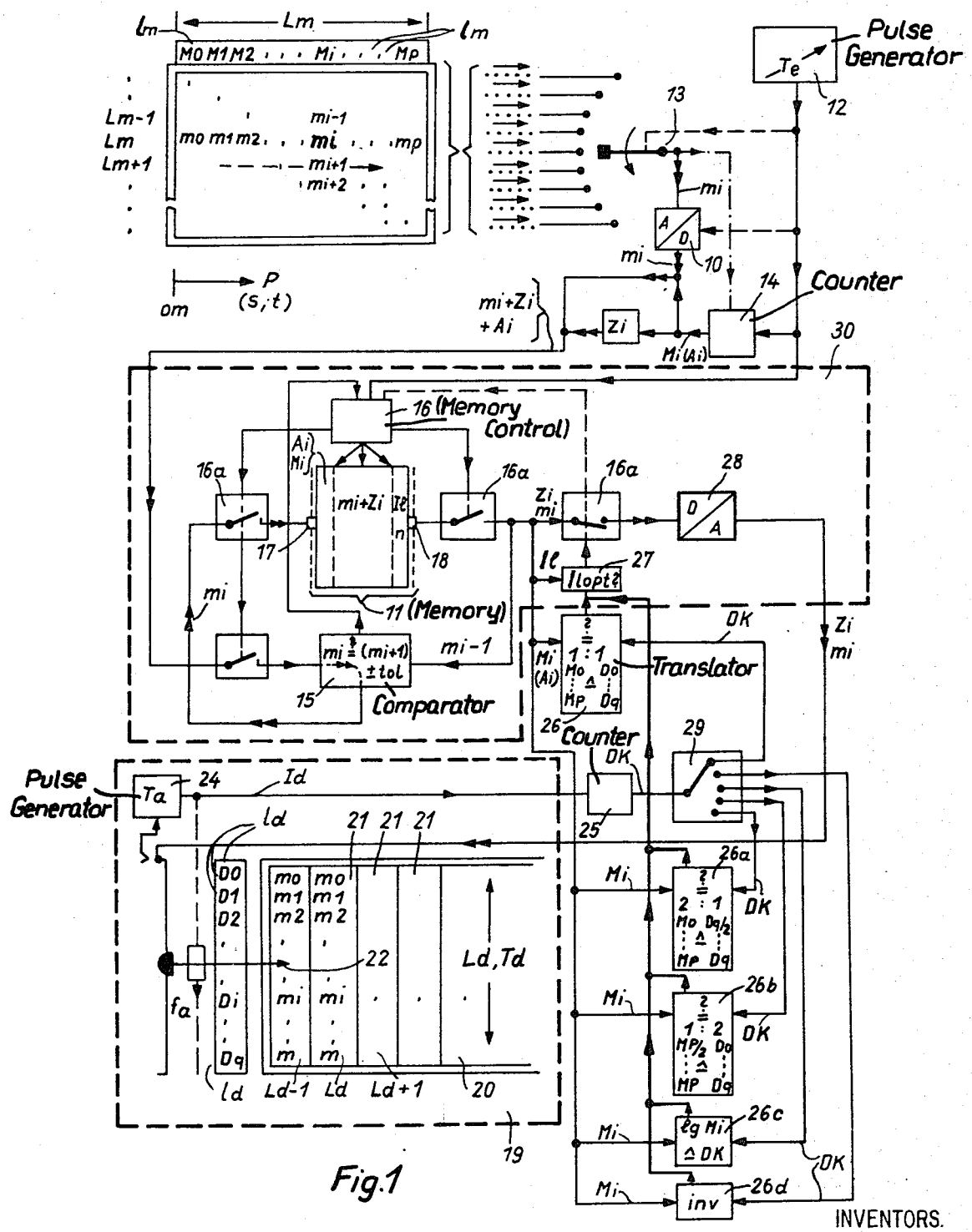
FIG. 1 is a schematic data flow diagram representation illustrating the method of the present invention.

FIG. 1 is a schematic basic diagram illustrating the operation of the method according to the present invention and simultaneously serves, by means of block circuit diagrams, to introduce and explain a preferred circuit embodiment for performing the present invention.

As schematically indicated in the upper left hand corner of FIG. 1, each measuring period $Lm$ is divided into a plurality of measuring intervals $lm$ each of which is associated with a respective position identifying value or marker $Mi$ where $i$ equals a number from zero to $p$, i.e. $Mo$ to $Mp$. In each measuring interval $lm$, a measured value $mi$, e.g. an amplitude or phase information or value representative of a physical value, is determined. If the measuring processes involve the measurement of an independent variable P over time $t$, the measuring intervals $lm$ represent time intervals. If the independent variable P of a measuring period $Lm$ is, for example, the location $s$, or a linear unit, the measuring intervals $lm$ are linear, then the position identifying values or markers $Mi$ identify, for example, various distance measurements. After expiration of each measuring period $Lm$ a new measuring period $Lm+1$, $Lm+2$ etc. takes place.

In order to be able to separate sporadic erroneous statistical measurements with a suitable comparison circuit, the measuring conditions are preferably so selected — under substantially known conditions, for example, by sufficiently small quantizing of the measuring period $Lm$ or by the repetition density of the measuring periods $Lm$ — that for comparable measurements between each two measured values $mi$ and $mi+1$ or measuring periods $Lm$ and $Lm+1$ within the limits of a certain tolerance range to 1, the same measured values $mi$ for two consecutive measured values $mi$ and $mi+1$ or corresponding measured values $mi$ of consecutive measuring periods $Lm$ and $Lm+1$ can be expected.

Each individual measured value $mi$ associated to a measuring interval $lm$ and thus to a position identifying value or marker $Mi$ is written into a memory circuit 11, if required after quantization in an analog/digital converter 10. The writing in occurs at a writing pulse timing or frequency $Te$ which is preferably the clock pulse output from a clock pulse generator 12 which also controls, for example, a scanner 13 for the successive processing of the measured values $mi$ in the analog/digital converter 10. Thus this writing pulse timing $Te$ particularly serves to determine the measuring intervals $lm$ with their associated measured values $mi$ and perhaps also additional information $Zi$. The total of the measured values $mi$ associated to one measuring interval $lm$ and of the additional information $Zi$ (for which examples will be given later on) will hereinafter be simply called the information. The path of the information is shown in the block circuit diagrams of the drawings by a double arrow.

After passage of one measuring period $Lm$, i.e. after the last measuring interval $lm$ with the position identifying value $Mp$ has been reached, a new measuring period $Lm+1$ is initiated.

The respective position identifying values $Mi$ can be simply provided by the momentary position of a counter 14 which is started anew with each measuring period $Lm$ independent of whether or not the duration of the measuring period $Lm$ is given by a fixed number of measuring intervals $lm$ (as assumed in the upper left of FIG. 1) so that the scanner 13 can be switched to a new measuring period $Lm+$ when the write-in pulse frequency $Te$ has been counted out and position identifying value $Mp$ has been reached, or whether or not the length of each measuring period $Lm$, and thus the number of its measuring intervals $lm$, is determined by the conditions of the measuring location or other separately acting control values.

FIG. 1 furthermore shows the example of a write-in pulse frequency $Te$ which remains constant during each measuring period $Lm$, i.e. where there are equidistant measuring intervals $lm$. The advantages of a variation in the write-in pulse frequency $Te$ will be discussed later.

Each information stored in memory circuit 11 has associated with it an address $Ai$ which advisably is the position identifying value $Mi$ associated with a measured value $mi$ or corresponds thereto in a given relationship. However, in order to reduce the required circuitry and storage capacity, before a new measured value $mi+1$ is written into a free location in memory circuit 11, it is compared in a comparator 15 with the most recent corresponding measured value $mi$ which has already been stored in memory circuit 11. The latter may be that value, for example, which has been determined in this new measuring period $Lm+1$, but in the preceding measuring interval $lm-1$, and the comparison may be limited, in the event different characteristics are determined and stored for each measured value $mi$, to the characteristic of interest in the present case, e.g., amplitude only or fundamental carrier frequency only, for measured values $mi$ to be compared.

If it is determined in the comparator 15 that, within the limits of a given tolerance range (tol) an old measured value $mi$ in memory 11 and the new measured value $mi+1$ to be compared therewith coincide, the new measured value $mi+1$ is written into memory 11 in place of the old measured value $mi$ at the same time an identity or comparison value signal $Il$ which is provided for each individual location in memory 11 is upgraded by one unit. Depending on the definition of "upgrading", the comparison value signal $Il$ is, for example, increased or decreased in its numerical value. The upgrading of the comparison value signal $Il$ is an indication of the fact that this particular location now contains a measured value $mi+1$ which was confirmed, regarding given tolerance criteria, from a measured value $mi$ of older origin with which it was compared. The next following comparison is now based on the stored information or its component which is relevant for the particular comparison, respectively, i.e. the given tolerance region tol slides along with fluctuating measured values $mi$ which are still considered applicable.

When such a confirmation does not occur during a comparison in comparator 15, it is advisable not to erase the previous measured value $mi$ but rather to write the new measured value $mi+1$ into some other momentarily empty location in the memory and to provide it at the same time with the identity value $Il$ of the lowest order of value, i.e. the identity minimum $Il$min, as a sign that this memory location now momentarily contains some sort of entirely new, unconfirmed measured value $mi$.

Before further new measured values $mi$ from a successive measuring period $Lm+2$ arrive, the entire contents of memory 11 is cleansed in that the identity values $Il$ of all the memory locations which did not obtain an upgrading of their identity characteristic $Il$ during the last measuring period $Lm+1$, are downgraded by one unit. Memory locations with a minimum identity value $Il$min for older measured values $mi$, which had not been confirmed several times in a row and which thus continuously had their identity value $Il$ downgraded so that it can no longer be downgraded any further, are thus simultaneously erased.

Since the present invention continuously eliminates older and rarely occurring measured values $mi$, or measured values that were not confirmed in a sequence of sufficient length by means of the criterion of the identity characteristics $Il$, care is taken that only good information (good in the sense of the comparison criterion affirmed by the momentary identity characteristic $Il$) can occupy memory locations. A sufficient number of free memory locations is generally available for new, not previously encountered, measured values $mi$ so that these new measured values $mi$ can be available in the respective following measuring periods $Lm+1$ for the above-described comparison with the preceding measuring period $Lm$.

A typical embodiment will be described and explained with the aid of a detailed block circuit diagram in connection with FIG. 3 for a circuit arrangement and the required control circuits 16, 16a to perform this selection process in cooperation with the write-in access arrangement 17 and read-out access arrangement 18 at memory 11.

Completely independent in time of the previously described compilation, storage and evaluation of measured values $mi$ of each measuring period $Lm$ is the display of measured values $mi$ according to the present invention within each display range $Ld$ or each reproduction period $Td$. The reproduction of the conditions during measuring periods $Lm$ may occur, by means of a recording device 19 on a recording strip 20 in the form of markings corresponding to the measured values $mi$ as they are read out of memory 11. For example, as will be explained in detail in connection with FIG. 2, these measured values $mi$ may be displayed on recording strip 20, in this case also recorded simultaneously, with the known configuration of an echograph, one below the other in columns 21 for each measuring period $Lm$ and in adjacent columns 21 for consecutive measuring periods $Lm$, $Lm+1$. The length of each column 21 is the display range $Ld$. A suitable marking implement 22, e.g., a writing stylus in the illustrated case, is employed to produce the markings. The marker 22 traverses the entire length of column 21 once during each display period $Td$ and the informations are contained in the respective position of each marking and possibly also in its intensity. The display range $Ld$, i.e. the useful width of recording strip 20 and thus the length of columns 21, is divided into - preferably equidistant - display sections $ld$. Each one of these display sections $ld$ has a consecutive location number or value $Dk$ associated with it where $k$ equals a number from zero to $q$, i.e. $Dk$ varies from $D0-Dq$. A location pulse generator 24 is coupled to the movement of marking implement 22. The respective result of the count of location pulses I$d$ in a location counter 25 which starts counting anew with each display interval T$d$ indicates the momentary position of marking implement 22 within the display range L$d$.

The repetition frequency of the location pulses I$d$ determines the read-out pulse frequency or timing of read-out pulses T$a$ for the information available in memory 11. In a preferred application of the present invention, this read-out pulse frequency has a substantially lower frequency than the frequency of write-in pulses T$e$. Thus it is assured that for measuring periods L$m$ which are not extremely long, the same memory location will not be read out twice without at least one new measuring period L$m$+1 having passed in the meantime and perhaps a new measured value $mi$+1 for each display section I$d$ has been made available upon comparison of its identity or an already present value has been confirmed.

In one embodiment of the present invention the frequency of the read-out pulses T$a$ is advantageously selected, when compared to the frequency of the write-in pulses T$e$, to be so long that a plurality of measuring periods L$m$ pass during each display period T$d$ and consequently a plurality of comparisons can take place between two associated measured values $mi$ and $mi$+1. If care is taken that only such measured values $mi$ which have been confirmed sufficiently often, i.e. only such values having an optimum comparison value I$l$opt (a value which can no longer be upgraded during renewed confirmation) are read out of memory 11, it is assured with great probability that accidental or erroneous measuring results among the measured values $mi$ will not be displayed at all.

In the simplest case of realizing such circuitry, that information is read out of memory 11, for the case $p=q$, for each display location number D$k$ of display range L$d$, which is provided with the same measuring position identifying value M$i$ of one measuring period L$m$ — or with a corresponding address A$i$ — if a sufficiently often confirmed measured value $mi$, i.e. a measured value with the optimum identity value I$l$opt is present. A useful measuring result for a defined measuring interval I$m$ in a measuring period L$m$ is thus displayed in a defined, associated display section I$d$ of the display range L$d$.

This association or comparison between the measuring position identifying values M$i$ or addresses A$i$ and display location number D$k$ are accomplished by a digital translator 26 which reads the associated information out of memory 11 for each position of marker 22, i.e. for each display location number D$k$, and switches it, if an identity control circuit 27 furnishes a positive result with respect to the comparison value I$l$ — if necessary via a digital/analog converter 28 — , to marking implement 22 as a good measured value $mi$ to be displayed.

The removal of the coupling between measured value input and reproduction in the present invention permits such advantageous variations of the scale of reproduction simply by the appropriate variation of the ratio of the frequency of the write-in pulses T$e$ at pulse generator 12 to that of the read-out pulses T$a$, i.e. without any kind of changes in the circuitry of the translator 26 or in the function of recording device 19, and with the use of only one translator 26. The limit of applicability in practice for these possibilities lies only and alone in the reasonable relationship between obtainable resolution and desired measuring range. Aside from the advantage of a uniform translator 26, this further development, where, for example, only the control pulse T$s$ is influenced, exhibits the further advantage that the quantization of the measuring range L$m$ can be adapted right from the beginning to the selected scale since only the number of intervals l$m$ that can be displayed in one column 21 are formed so that the memory capacity is limited to the minimum required size.

Whereas in the previously described embodiments the translator 26 took care that the entire content of memory 11, insofar as concerns informations having the optimum identity values I$l$opt, was directly displayed, so that each measuring interval l$m$ was proportionally associated to one display section I$d$ and thus a linear, true-to-scale reproduction of the conditions of measuring periods L$m$ was recorded over the entire display range L$d$, the method of the present invention is also very advantageous if only such informations which are associated to certain measuring position identifying values M$i$ are recorded either alone or additionally in parallel and either over the entire display range L$d$ or only over a certain selected portion thereof.

Such problems are encountered, for example, in slave indications regarding certain criteria, for example when different types of observations are to be made for a series of measured values $mi$ and only measured values $mi$, for example, from the last third of the entire measuring period L$m$ are to be displayed — preferably at an enlarged scale extending over the entire available display range L$d$ — and/or measured values $mi$ from a selected portion of the measuring period L$m$ are to be recorded in only a partial region of the display range L$d$ in an expanded manner while perhaps simultaneously recording different informations — for example, manual notations or additional informations Z$i$ — in the remaining portion of the display range L$d$, e.g. at the head of columns 21. For these supplemental additional possibilities, appropriately designed translators 26 are required when the frequency of write-in pulses T$e$ is not influenced. In the embodiment of FIG. 1, these possibilities are realized by the additional translator 26$a$ for reading out the entire contents of memory 11 and writing it into the lower half of recording strip 20 and by the additional translator 26$b$ for the association of the second half of measuring position location values M$i$ with the totality of all display location values D$k$ of the given display range L$d$. The problem of operating a plurality of conventional recording devices 19 in parallel for recording the results from one and the same measuring period L$m$, can be considered to be solved only with the present invention for many practical applications in which due to intermediate storage of the information, stylus marker 22 may have any possible position, entirely independent of the momentary conditions of measuring period L$m$. Each individual recording device 19 now produces or displays information — independent of the momentary operating state of other recording devices — through a translator 26, which information is present in memory 11 corresponding to the momentary position of its respective stylus marker 22. The resulting, very important degree of freedom with respect to measuring value input and reproduction was heretofore not readily or economically available. Accordingly it was generally impossible to obtain synchronism for a plurality of echographs and to operate with parallel-connected electromechanical recording devices, since the expenditures involved were not justifiable in the practice of the user of such systems.

In order not to show a plurality of recording devices 19, such different possibilities are considered in FIG. 1 by a selector switch 29 with which the user of an apparatus according to the present invention can select the type of display he desires utilizing only a single recording device.

With such an arrangement, i.e. when translators 26a and 26b are utilized, informations in memory 11 whose addresses $Ai$ or measuring position location values $Mi$ have no associated display location value $Dk$ for translator 26a and any display section $ld$ of display period $Td$ whose display location value $Dk$ has no associated addresses $Ai$ for translator 26b are not considered during read-out of the information or during recording or display of the information. The limits of practical applicability of this possibility are set in the case of translator 26a by the consideration of whether or not too many details of the succession of measured values $mi$ from one measuring period $Lm$ or consecutive measuring periods $Lm$ will be lost if only a small number thereof are displayed close together in a crowded area, and are set in the case of translator 26b in that with column-type recording of measured values $mi$ in varying degrees of blackening or by a curve consisting of sequences of dots, no clear diagrammatic display results when only a small number of measured values $mi$ are distributed at correspondingly large spacings from one another over relatively long columns 21. When the use of such an expanded display is expected to occur too often, it is advisable to divide the measuring period $Lm$ into a larger number of measuring intervals $lm$ which is much larger than the number of display sections $ld$ provided so that even in the last-considered case, a dense sequence of measured values $mi$ can still be obtained.

In order to freely change the display area within display range $Ld$, it is only necessary to make changes in the circuitry of the digital translator 26 or regarding the clock pulse frequency at the input of counter 14, which can be programmed, for example for the display scales of interest, and which can be selected by switches. This switching may even be controlled by the measuring result itself since all that is involved is a variation in the linkage of the digital decoding matrix or in another case, a variation of a control parameter for the triggering or the natural frequency of the clock pulse generator 12.

Such a possibility of switching the measuring range is of particular interest with recording devices 19 which have mechanically movable parts such as echographs with a stylus band writer or a stylus arm writer. As much as these devices have been modified during the past decades of practical use, the kinetic conditions still remain the most significant source of errors or malfunctions with respect to their long lifetime and precision, particularly in view of the rough environmental conditions and continued operation without much maintenance as is encountered, for example, when used on deep-sea fishing expeditions.

In addition to this above-mentioned weakness of such mechanical recording devices, additional limiting conditions must also be considered. Stylus speeds which are too slow reduce the recognizability of the recording on the recording strip 20, for example, because of too much burning of the spark recording paper, whereas fast stylus speeds produce the annoyance of rapid wear of the writing stylus, i.e. of marker 22. Additionally, with regard to the drive means for the stylus, considerable expenditures are required for motor controls and reduction gears, and in the embodiments of conventional echographs employed in practice the useful variation of the stylus speed lies between about 1:2 and 1:8 so that only a relatively small number of scales can be produced because of the given speed of propagation of sound in water. According to experience, the highest scale range realizable is only in the order of magnitude of about 1:100, with justifiable wear of the stylus. The long-known method of avoiding this limitation by arranging a plurality of individual styli closely adjacent one another in the manner of a comb and controlling them consecutively or in any desired sequence by means of electrical means has not been accepted in practice, probably, inter alia, because the realizable resolution naturally depends on the number of adjacently disposed writing styli, which number is limited with a given display range $Ld$ and given writing voltages because of the spacing required to protect against sparkover, and because of the quite obvious drawback in practice that the individual styli wear out to different degrees.

Practically all such problems and drawbacks inherent in conventional echographs are eliminated when an apparatus is employed for performing the method according to the present invention which apparatus is connected between the measured value determining arrangement and the measured value display. For example, in the echo sounding art, the apparatus according to the invention is connected between the input amplifier or possibly the selection circuit for received echo signals and the control of the echograph. The use of apparatus according to the present invention here permits a free variation of the display possibilities as it has not been possible previously. The method and apparatus according to the invention additionally makes it possible to realize special effects utilizing constant speed mechanisms for the recording devices 19 simply by switching relatively uncomplicated circuits constructed of standardized circuits from the digital art, particularly in translator 26 or in connection with clock pulse generator 12.

By means of the translator 26c, another advantageous possibility for varying the selection of display of the measured values $mi$ is indicated, which had no chance of a practically applicable realization with previous systems utilizing mechanical recording devices. In the translator 26c the measuring position location values $Mi$ are logarithmically associated with the display position values $Dk$. With a system utilizing such a translator 26c, although the measured values are recorded during the measuring period L$m$ and are processed up to memory 11 linearly in time, and although the mechanically and dynamically simplest manner is maintained for the marker 22 which is moved at constant speed across display range L$d$ for the displaying process, the association between logarithmically increasing numbers of measuring position values M$i$ or addresses A$i$ and further linearly increasing display location values D$k$ results in a logarithmic scale in the display of measured values $mi$ on recording strip 20. Such a display provides the known advantages of a measuring accuracy which is uniform over the entire measuring range under consideration and with constant resolution and optimum utilization of the display range L$d$.

Such freely selectable and dimensionable associations are made possible with the method according to the present invention in that the processes of determining the measured values $mi$ and their display take place entirely independent of one another.

The above-mentioned digital operations to be employed in performing the method of the present invention, such as quantization, comparison, clock pulse generation and division, counting, switching and data transfer in dependence on logic conditions and the like, are common problems in present-day digital eletronic systems which are realized increasingly schematically by means of standardized modules of the integrated circuit art. Accordingly the structural configuration of the present invention not only exhibits the advantage that it can be economically produced from mass-produced basic units in spite of the complex individual functions involved, but also it can quickly be dimensioned for the given requirements of a special application, and experience has shown that it will then dependably operate without any further circuit engineering work.

The circuit arrangements and auxiliary displays shown from FIG. 2 on relate even more strongly than the preceding portion of the specification to special but typical cases of application for the method of the present invention. They are intended to show more precisely the advantageous possibilities of the method of the present invention and simultaneously indicate useful and advantageous modifications and variations of the present invention without limiting the significance of the present invention to these applications.

In the following selected embodiments of the invention, reference is always made to applications in the reflected beam sounding art, particularly in the echo sounding ranging art for navigational purposes, surveying and fishing, i.e. for surveying the depth of bodies of water and the location of fishing grounds. In the following embodiments for devices for performing the method of the present invention there are shown, in addition to the above-mentioned arrangement for comparison of a measured value $mi$ with a comparable older measured value $mi-1$, other devices which are particularly advantageous in connection with the present invention for reducing the compiled data to the information of interest, in the interest of maintaining the capacity of memory 11 within acceptable limitations. Moreover, further applications of useful variations are explained in view of the purposes selected in the particular example.

Aside from the special characteristic of the information processing component 30 which will be specified in detail in FIG. 3, the combination of the devices shown in FIG. 2 substantially corresponds to that of a conventional echo sounding device, for example, for determining the profile of the bottom 31 of a body of water 32 or for location of fish 33 and for determining the depth of a towed fishing net 34.

The advantageous use of apparatus according to the present invention for measuring depths will first be considered. The measuring path 36 to be determined is disposed between a transducer 35 and the bottom 31 of the body of water 32 in FIG. 2. The measuring period L$m$ of FIG. 1 corresponds to this measuring path 36 and is initiated by the transmittal of a pulse signal $se$ by the transducer 35. Upon return of the transmitted signal S$e$ and reception as a bottom echo signal B$e$ of interest from bottom 31, a measuring period L$m$ is completed and a new measuring period L$m+1$ can be begun, for example at the same location. Preferably, however, the new measuring period is begun at a location offset with respect to the location of the preceding momentary measurement by a certain amount in that the surveying vehicle 37, which is the carrier of the surveying system, is moved.

The display of the measured values $mi$, i.e., of the measuring result of the length of the measured path 36 and thus of the momentary depth of body of water 32, is accomplished in the embodiment of FIG. 2 on a conventional echograph 38 (see the recording device 19 of FIG. 1) by means of a writing stylus 40 (see marking implement 22 of FIG. 1) which is fastened to a rotating stylus band 39. The stylus 40, in a known manner leaves a succession of markings 42 in response to a writing voltage applied via a contact rail 41 on a recording strip 20, e.g. on electrically sensitive paper by spark traces.

The recording strip 20 is moved in a known manner, which is not shown in detail in FIG. 2. For example, the strip 20 may be moved at a continuous, slow speed by means of a continuously active forward movement drive or discontinuously by the stylus 40 after it has passed over the entire width of the recording strip 20 via a follower mechanism in dependence on the rotation of the stylus 40. In the case of the embodiment shown in FIG. 2$a$ the stylus band 39 is continuously driven by an advance motor 43 as the drive mechanism 50, if required via a step-down gear 51, whereas in the case of the embodiment of FIG. 2$b$ a stepping motor 52 effects a discontinuous drive of the stylus band 39 in steps of a suitably fine graduation. While a direct speed control is practically impossible with extremely slow moving d.c. drives, the selection of the stepping motor 52 illustrates the advantage that, according to the invention, it is possible to realize, without mechanical reduction gears and simply by a control of the location pulse generator 24, any desired slow rotary movement in defined small steps which may be necessary, for example, for the display of the measured values $mi$ of a very long measuring path 36.

Further advantages of the selection of the stepping motor 52 as the drive for the writing stylus 40 will become evident in connection with FIG. 3. A recording device 19 with a writing stylus 40 on a stylus band 39 or on a pivot gear are selected here as examples only for reasons of simplicity. Moreover, marking implement 22 in the form of a writing helix on a rotatably mounted roller or, in other applications, a punch pattern cutter or the writing head of a magnetic storage device serve similar purposes in a known manner for displaying or recording of measured values $mi$ and should be considered equivalent in connection with the present invention.

The measured values $mi$ in this first case of application under consideration are assumed to be the amplitudes during echo sounding at defined points in time (beginning with the transmission of a signal $Se$ at the starting point $mo$ in FIG. 1) and thus bottom echo signals $Be$ received with defined momentary measuring position location values $Mi$. The additional informations $Zi$ may be informations relating to the measured values $mi$ of interest about the location of the measurement, for example, with reference to the kilometer along a stream or channel and/or transverse thereto with reference to a fixed point on shore, information about the momentary level of the tide, date or series of measurements and the like, association of received echoes to a certain transmitted signal $Se$ from a group of simultaneously transmitted signals, or the momentary measuring range and measuring scale and the like. Such auxiliary data which might be required for the later evaluation or might be at least useful in connection therewith may be associated to the momentary measured values $mi$ either manually or via special measuring locations. In FIG. 2 this auxiliary data is supplied by means of an auxiliary data input device 53.

Particularly in the depth measurement of bodies of water, the first bottom echo signal $Be$, i.e. the location of the upper edge of the bottom 31, is of foremost interest and then perhaps also the further arriving bottom echo signals $Be1$, $Be2$,... which permit, in a known manner, conclusions about the inner structure of the bottom 31. Earlier appearing echo signals, which may be caused, for example, by fish 33, drifting material or air bubbles, and other interfering signals are filtered out, if possible, by suitable filter circuits 55 connected to the receiving amplifier 54.

If the information contained in the amplitude path and in the length of the bottom echo signals $Be$ is not considered, a requirement which is absolutely sensible for surveying to determine cross-sectional profiles of bodies of water 32, the only measured value $mi$ required from each measuring period $Lm$ for this reduced purpose consists only of the travel time information regarding the time interval between transmission of the signal $Se$ and reception of the bottom echo signals $Be$. In the illustrated method of FIG. 1, in view of the running time variable utilized to provide the measuring position location values $Mi$, the momentary value of $Mi$ at the arrival of the bottom echo signal $Be$ constitutes the measured value $mi$. Only this case will first be discussed in connection with FIG. 3 and in the following description of a first embodiment for the information storage and processing unit 30.

In the circuit arrangement shown in FIG. 3 for an information storage and processing unit 30 for use in a measuring arrangement for the purpose discussed above in connection with FIG. 2, a free running clock pulse generator 12 furnishes the central control pulses $Ts$ for the entire digital information processing. There control pulses $Ts$ simultaneously serve as the write-in pulses $Te$ discussed in connection with FIG. 1 for memory 11 and to quantize the measuring period $Lm$ into measuring intervals $lm$. The beginning of a measurement is indicated by means of a start key 56. Closing of the switch 56 causes a transmitter 57 (shown only in FIG. 2) to be triggered to emit, via the transducer 35, a transmitting signal $Se$, and simultaneously a switch in the information storage and processing unit 30, for example a flipflop 58, which itself switches a gate 59 to be enabled.

In the circuit embodiment now under consideration no use is made of differently dimensioned translators 26 – 26$d$ as in FIG. 1. Rather the measuring range for the display can be selected by an adjustable pulse frequency divider 60, so that the quantization, i.e. the number of measuring intervals $lm$ per unit time, can be varied with constant quantization of the display range $Ld$ as discussed below. The output pulses at the output of divider 60 represent a reduced frequency of control pulses $Ts$ which are counted during the duration of a measuring period $Lm$ in a depth counter, counter 14 (see FIG. 1). The momentary result of this count within one measuring period $Lm$ represents the respectively reached travel time parameter or measuring position identifying value $Mi$. For reasons which will be discussed later, the counter 14 is advantageously a combination of a primary counter 61$a$ and a carry counter 61$b$.

The value $Mi$ present in counter 14 at the moment of the arrival of a bottom echo signal $Be$ is now written via a transfer circuit 62 into a first intermediate memory 63 as the desired measured value $mi$ of the present measuring period $Lm$. Simultaneously, if required, the intermediate memory 63 is supplied with additional available informations $Zi$ from the data input device 53 which furnishes these in the same manner in a binary code.

With the measuring sequence selector switch 64 set at position $a$ as illustrated, the received bottom echo signal $Be$ also resets flipflop 58 so that gate 59 is again blocked and no further control pulses $Te$ are counted into counter 14. Since the central control pulses $Ts$ are further required for the operation of the measuring value processing (data transfer) in the embodiment here under consideration, the clock pulse generator 12 must not be stopped even in the pause between two measuring periods $Lm$ and $Lm+1$. By resetting flipflop 58, a reset pulse $Ir$ is delivered to counter 14 whereupon a new measuring period $Lm+1$ can be begun, e.g. via start key 56. Position $a$ of the measuring sequence selector switch 64, at which the start of a subsequent measuring period $Lm+1$ does not occur automatically, is used for special or unusual requirements. For example, this position may be used when it is advisable to set the measuring periods $Lm$ individually by hand, for example, for alignment, detecting of errors or calibration of the circuit.

If the measuring sequence selector switch 64 provided in FIG. 3 is switched to position $b$, then the arrival of the bottom echo signal $Be$ from the receiving amplifier 54 and filter 55 (FIG. 2) resets the flipflop 58 to generate the reset pulse $Ir$ and subsequently enables the flipflop 58 to close gate 59 and thus automatically initiate a new measuring period $Lm+1$. The enabling of flipflop 58 is preferably accomplished via a delay circuit 65, or another suitable blocking circuit dependent upon the momentary measured value $mi$ so that subsequently appearing multiple echoes $Be'$ of transmitted signals $Se$ which have passed over the measuring path 36 several times cannot interfere with the subsequent measurement. The measuring sequence and thus the length of the respective measuring period $Lm$ is thus adapted to the momentary conditions of measuring path 36. Protection against multiple echoes $Be'$ can also or additionally be incorporated in a known manner in filter circuit 55 (FIG. 2).

In position $c$ of the measuring sequence selector switch 64, the circuit is so designed that the measuring period $Lm$ always has a constant length. In this position the counter 14 is not stopped immediately upon the arrival of the first bottom echo signal $Be$ (this counter now effects only the transfer of data for a momentarily available counter result by means of transfer circuit 62) but rather it continues to receive pulses $Ts$ from the control clock pulse generator 12 until it reaches a given counting level, for example the maximum value of its counting capacity. Only a transfer pulse $Icc$ 1 appearing at this time resets flipflop 58 via this switch position $c$ and thus terminates measuring periods $Lm$. This mode of operation has different advantages in its practical application. For example, it may be possible that in spite of filter circuit 55 an erroneous pulse inadvertently acts as a presumed bottom echo pulse $Be$ on the information processing unit 30 whereas the true bottom echo signal $Be$ would appear much later. Since the measuring period $Lm$ in position $c$ of switch 64 is now not terminated immediately after the first arriving pulse, both arriving measured values $mi$ (in the present case as running variables $Mi$) are transferred consecutively to the first intermediate memory 63. In the course of the comparison of the measured values and under consideration of the comparison values $Il$ discussed in connection with FIG. 1, only the true measured value $mi$ of the actual bottom echo signal $Be$ will be displayed because only this signal will be repeatedly confirmed in consecutive measuring periods $Lm$ which will be discussed in detail below.

A further practical significance of position $c$ of the measuring sequence selector switch 64 can be seen in that, as already mentioned, when surveying bodies of water, bottom layer formations at the bottom 31 of a body of water 32 are often of interest in addition to the momentary depth (in FIG. 2 the measuring path 36), which bottom layer formations lead to successively arriving bottom echo signals $Be$ 1, $Be$ 2, .... In position $c$ it is thus possible in addition to the first original bottom echo signal $Be$ from the bottom 31, to compile and evaluate those further arriving bottom echo signals $Be$ 1, $Be$ 2, ... which occur before counter 14 has reached its set maximum value and has terminated the present measuring period $Lm$ by means of the transfer pulse $Icc$ 1.

With unfavorable reflection conditions at the bottom 31 it may occur in practice that a bottom echo pulse $Be$ does not arrive at all during a sounding period $Lm$. In order not to have to unnecessarily expand the individual measuring periods $Lm$ and/or not to have to suffer an interruption on the automatic measuring operation, it is advisable to replace position $b$ of the measuring sequence selector switch 64 by a position $d$ in which, in the described exceptional case of unfavorable reflection conditions, the criteria according to position $c$ will still be effective. In position $d$, the start of a new measuring period $Lm+1$ is initiated by transfer pulse $Icc$ 1 at the latest when the selected maximum value has been reached in counter 14, if it has not been initiated earlier by a bottom echo signal $Be$. For this purpose an AND logic gate 66 is provided which combines the two criteria according to positions $b$ and $c$ into that according to position $d$.

The momentary counter position of counter 14 as determined by transfer circuit 62 thus represents measured value $mi$. When the first intermediate memory 63 has stored this value and perhaps also additional informations $Zi$ associated therewith the information is first advisably transferred by means of suitable intermediate memory controls 67a, 67b (in FIG. 1 these controls were indicated generally by memory circuits 16 and 16a) into a second intermediate memory 68 where it is then available to the final memory 11 for comparison operations with comparable older measured values $mi$ and for writing in as soon as a free memory location appears at the write-in access 17.

According to one aspect of the present invention, the memory circuit 11 is itself comprised of closed ring-type shift registers having as many bits as are required for storing of the measured values $mi$, possibly further additional informations $Zi$ as well as the identity or comparison characteristics $Il$ for the memory location and finally further data for the memory control itself. It must also be considered when dimensioning the memory circuit, that a plurality of measured values $mi$ must be stored which will not appear later on when they are not confirmed sufficiently. The expenditures for the dimensioning of the memory 11 depend on the information limitation permissible for each particular case. The specific requirements and individual functions of the intermediate memories 63 and 68 as well as for the controls 67a and 67b for the intermediate memories depend in each case on the type and function of the selected memory circuit 11 and are thus not symptomatic of the present invention.

The shift register constituting memory 11 is rapidly shifted by a write-in control 69 so that all memory locations have passed completely through at least once and usually even several times during the shortest measuring period $Lm$ to be expected. During the shifting, whenever the output of the second intermediate memory 68 is coupled to an unoccupied location in memory 11 via write-in access 17, the information contained in this second intermediate memory 68 is written into the presented unoccupied or free memory location.

During this cycling or shifting of the informations in the shift register, the identity comparison between the new measuring value $mi+1$ appearing at the output of the second intermediate memory 68 and an associated older measuring value $mi$ takes place in a comparator 15. In the case of the embodiment illustrated in FIG. 3, this operation can be accomplished with particularly low expenditures since the only measured values $mi$ being presented for comparison are the measuring position identifying or travel time values $Mi$ which represent the arrival of bottom echo signals $Be$. The identity control is defined, in a simple exemplary case, as being successful when during one cycle of all the information in memory 11 an older measured value $mi$ is found which sufficiently coincides with the presently available new measured value $mi+1$.

During cycling of the information in the shift registers a comparator 15, e.g. a simple digital difference circuit, which, in spite of the binary coding of the information, advisably operates in decades for economical reasons, successively forms the absolute difference between the old measured value $mi$ stored in each memory location as it is presented at the readout output 18 and the new measured value $mi$ at the output of the second intermediate memory 68. This identity control is thus considered to be successful per definition, when for any one of the total of memory locations of memory 11 a difference which lies within a tolerance range (tol) selected by a tolerance value generator 70 appears at the output of comparator 15 at any time during such a cycle. In the event of a successful identity comparison, an evaluator 71 determines the momentary comparison identity value $Il$ of the respective memory location and upgrades it by one unit unless the identity or comparison optimum signal $Il$opt has already been reached which then remains in existence. Advisably the old measured value $mi$ is simultaneously replaced by the new one so that the set tolerance region (tol) always extends uniformly on both sides of the valid measured value $mi$. A coupling between the tolerance value generator 70 and a selection possibility for the measuring range, e.g. divider 60, effects a constant measuring accuracy.

A new measured value $mi$ which can not be confirmed in this manner by a stored older value is transferred, after one cycle of the memory locations, into the next free memory location and is provided with the lowest possible identity value signal $Il$min. The memory 11 must therefore be dimensioned large enough to be able to store, in addition to the calculatable number of useful results, measured values $mi$ for which no determination has yet been made as to whether or not they constitute erroneous measurements.

In addition to providing for an upgrading of the comparison or identity value $Il$, evaluator 71 produces a marker $n$ which may consist of a single bit, in each memory location which has been provided with new information during the present cycle of the informations in memory 11, i.e. each memory location which has either had its comparison value $Il$ upgraded or in which new information has been written for the first time. These markers $n$ are utilized to insure that the older measured values $mi$, i.e. such values which were not confirmed during a plurality of past measuring periods $Lm$ with respect to a newer measured value $mi$, gradually disappear from the memory circuit 11 for the purpose of providing free memory locations for future measured values $mi$. These markers $n$ are deleted by a clearing or cleaning circuit 72 in each following cycle of the information in the memory 11, for example at the end of each measuring period $Lm$ or after a single cycle of the stored informations. In the course of this next cycle of the stored informations during which no new measured value $mi$ is present, this clearing circuit 72 causes the evaluator 71 to reduce the comparison value $Il$ by one unit in each memory location which has not just had its information content changed, and which consequently does not have a marker $n$. Simultaneously, the existing markers $n$ are erased in that the one bit is again removed. If, however, the identity minimum value $Il$min is already present at a memory location without the marker $n$, the contents of this memory location is now erased completely, i.e., the location is again available to accept new measured values $mi$ from subsequent measuring periods $Lm$ from the second intermediate memory 68. In that latter case, i.e. when the cleaning circuit 72 gets at the same time "$Il$ min" and "no marker $n$" information, it orders the evaluator 71 to erase that memory location completely.

The intermediate memory control circuits 67a and 67b as well as the write-in control circuit 69 and also the different possible circuit configurations of, for example, the digital transfer circuit 62, counter 14, comparator 15 and evaluator circuit 71 are not considered to be the object of the present invention or variations of the present invention — unless expressly specified to the contrary — since their design depends, in each individual case in practice, entirely upon the selection of the digital processing mode (parallel or serial, preferred code, logic testing and control conditions) as well as upon the type of memory circuit 11 employed in each individual case, e.g. core memory or shift register. Such circuits can be obtained from known producers of such digital circuits — which in the future will predominantly be of the integrated type — already adapted to the respective requirements, unless special features are concerned for which protection is claimed within the scope of the present invention and which will be appropriately mentioned within this specification.

From the above discussion of the signal storing and processing unit 30, it can be seen that the capacity of memory 11 represents a critical value for the performance of the method of the present invention. In order to be able to utilize the memory capacity to its best advantage, the present invention thus introduces the concept of the comparison or identity value characteristic $Il$ which can be realized in the digital art with comparatively low expenditures and which, according to further features of the present invention, comprises the additional advantage of eliminating statistically occurring error measurements.

However, unfavorable extreme cases are conceivable in practice in which the conditions of the measuring path 36 lead to so many measured values $mi$ that the capacity of the memory 11 no longer suffices. This occurs, for example, when the surveying vehicle 31 crosses its own screw waters or those of another vessel or when another distinct interference source falls in the measuring path 36. This may also be the case when, with a strongly fluctuating bottom 31 of the body of water 32 and with a respectively unfavorable speed of the surveying vehicle 37, all the compiled measured values $mi$ are different from one another as if each one would be a uniquely occurring error measurement. To eliminate this problem it is possible to increase the tolerance range (tol) by means of the tolerance signal generator 70, and to thus obtain a somewhat more inaccurate measurement in that even with relatively strongly differing measured values $mi$ — which of course also may contain actual error measurements — the results of the individual measuring periods $Lm$ are considered to be confirmed. Alternatively, the speed of the advance movement of the vessel 37 may be reduced so that measuring paths are covered which lie closer together, and thus the differences between the measured values $mi$ of each two measuring periods are reduced so that the tolerance range (tol) can again be made smaller.

Independent of the conditions of measuring path 36, it may also happen that, with respect to the capacity of the memory 11, which for economical reasons cannot have any desired large dimensions and which should always be optimally utilized, there is an excess of measured values mi when, in position $c$ of the measuring sequence selector switch 64 (FIG. 2), the selection has been made too high, i.e. when, for example, too many bottom echo signals B$e$ 1, B$e$ 2.... or multiple echo signals B$e'$ arrive during each measuring interval $lm$. A further reason may be that the number of steps in the comparison identity value characteristics I$l$, between I$l$opt and I$l$min, is selected too large so that measured values $mi$ which at one time were good (were provided with I$l$opt) will remain in memory 11 unnecessarily long when they are no longer confirmed and occupy space therein until they have finally fallen to the minimum identity value I$l$min required for erasing.

Considerations regarding optimization showed, for example, that for measured values $mi$ obtained during surveying of bodies of water 32 a graduation between I$l$min = "zero" and I$l$opt = "three" is sufficient. In such a case, evaluator 71 is constructed as a counter according to the so-called Gray code which for forward and backward counting to three exhibits the most favorable conditions regarding the circuitry required therefor.

In order not to have to dimension memory 11 itself excessively large and still not lose too many individual measured values $mi$, intermediate memories 63 and 68, in addition to respectively transferring measured values $mi$ from the counter 14, which continues to count in position $c$, and preparing a measured value $mi$ to be processed at the write-in input 17 of memory 11, may also simultaneously be utilized, in cooperation with the intermediate memory control 67$a$, 67$b$, to serve as a buffer in the event there is a temporary excess supply of data.

Technically more elegant and often required in practice is a further development of the present invention according to which the supply of measured values $mi$ is reduced by an automatically actuated control or regulating circuit when memory 11 is already rather full. It is here advisable to preferably select the momentary amplification factor of the receiving amplifier 54 (FIG. 2) in dependence on the momentary occupation density of memory 11 as the actuation criterion and, according to this dependency, to choke or cut off the supply of new measured values $mi$, if required, by a reduction in the amplification factor. To realize the solution of this partial problem in circuit means, the number of memory locations which are occupied or unoccupied, the number of memory locations provided with any one of the identity values I$l$ or not having this particular identity value, is determined, for example, by a counter 73 (FIG. 3) and the result of this count, which is present in analog or digital form, or a relative value regarding the total number of the available memory locations, is utilized as the control value for the amplification factor of the receiving amplifier 54. Advantageously any desired known integration and threshold value circuit 74 (FIG. 2) is connected ahead of the amplification influencing means so that the amplification is influenced over the time integral of the occupation density of memory 11. Preferably the circuitry is selectively so designed that the influence or change in the amplification is actuated, for example, only at a certain given occupation density to initially increase linearly and, with very dense memory location occupation, to increase exponentially or otherwise progressively. With such an arrangement it is assured that with much unused memory capacity many details value one measuring well as that L$m$ are compiled and processed in the previously described manner, whereas at a momentarily dense memory location occupation increasingly only particularly strong bottom echo signals B$e$ reach the information processing unit 30 so that the resulting measured values $mi$ represent with greater probability the bottom echo signals B$e$ from bottom 31 which are of foremost interest. Thus, the undesired situation that some of a plurality of good measured values are entirely eliminated because the memory 11 is overloaded is substantially avoided. The circuit realizations of integration and threshold valve circuits as realizations of a variable amplification factor with given characteristics are known to the expert in the art and need not be discussed in detail at this time. Instead of automatic influence on the amplification factor of the receiving amplifier 54, it is also possible to actuate the setting manually in dependence on an indication of the density of the momentary memory location occupation.

When such a control for the supply of data is available, the above-mentioned possibility of using the intermediate memories 63 and 68 as buffers is not required and they can be utilized exclusively as transfer memories for only a single measured value $mi$ = M$i$. This results in a particularly simple and economical embodiment since every intermediate memory 63 or 68 then need consist of only so many flipflops as corresponds to the number of bits of the information to be stored.

It can easily be seen from the above explanations of the operation of the write-in side of the information storage and processing unit 30 where, in the interest of compact functional description, only a simple special case for measured value compilation and processing was discussed, that the present invention comprises a number of variations of the above described embodiments, particularly in view of the criteria of the measured values $mi$ to be processed and regarding the information control between the second intermediate memory 68 and the controlling of the write-in process into the memory 11. Thus a comparison value signal I$l$ can still be treated as admissible when the optimum identity value I$l$opt was not required once or was not required for the first time, respectively, so that the previously confirmed measured value $mi$ can continue to be used with a one-time error measurement.

Before discussing advisable and inventive further developments of the previously described circuit for the information processing unit 30, the circuit embodiment shown in the bottom portion of FIG. 3 will be described for the process of displaying with reference to the corresponding illustration in FIG. 2, including FIGS. 2a and 2b, that is, for the display and recording process which occurs, according to the present invention, entirely separately from the process of processing the measured values $mi$ and their writing into the memory 11.

Since, as already mentioned, the respective display location value or parameter $Dk$ always represents an accurate indication of the momentarily affected display section $ld$, the generation of the display location value $Dk$ is advisably derived directly from the movement of marker 22 (in FIG. 1) — or of writing stylus 40 (FIG. 2). With a drive mechanism 50 for driving the continuously freely rotating stylus band 39 as shown in FIG. 2a, a separate pulse generator 75 is provided for generating the display location pulses $ld$. This pulse generator 75 comprises a pulse disc 76 and corresponding pickoff 77, which may, for example, in a known manner, be, respectively, a perforated disc and a light-sensitive pickoff for optoelectronic pulse generation or a toothed or coded magnetic disc and a coil for inductive pulse generation. According to a modification (not illustrated), it is also possible to realize the pulse generator 75 by perforating the stylus band 39 itself or, with the appropriate material, to provide the band 39 with alternating magnetic polarization at a repetition frequency which corresponds to the size of the individual display sections $ld$ or a fraction thereof. A possible band slip would then in no way interfere since the writing stylus 40 is firmly connected to the stylus band 39 so that the unambiguity of the location indication with display range $Ld$ would always be assured.

The display location pulses $ld$ produced by the pulse generator 75 are added in the location counter 25 whose result, the momentary display location value signal $Dk$, then defines this momentary position of the writing stylus 40 within the display range $Ld$. At the end of the display range $Ld$ the location counter 25 is stopped by means of the stop pulse $le$ generated via a stylus contact 78, which is actuated either mechanically or inductively by the stylus 40. By means of a starting pulse $la$ received from an appropriate stylus starting contact 79, upon the next passage of the stylus 40 the counter 25 is then reset and released to again count the location pulses $ld$ while the writing stylus 40 traverses the adjacent column 21 on the recording strip 20. It is to be understood that the use of a separate counter 25 to generate the values $Dk$ is by way of example only and that known digitally coded location generators for linear or rotary movement, in which a separate location counter 25 is not necessary, can also be employed for this purpose.

An even more precisely operating embodiment of the drive mechanism 50 comprises a stepping motor 52 which is driven by the pulse sequence output or by a whole number fraction of the pulse sequence output of the display location pulse generator 24 (see FIGS. 2b and 1). The slight discrete forward movement of the writing stylus 40 does not interfere in practice as long as this movement can generally still be considered uniform, i.e. with respect to the mechanical driving processes in the recording device 19 (here echograph 38), and since, according to the present invention, no continuous track is recorded across the display range $Ld$ but rather discrete, very closely adjacent partial sections $ld$ are provided with markings 42. It is a significant advantage of the use of a stepping motor 52 that its rotary movement can be controlled via the repetition frequency of the location pulses $ld$ to be as slow as desired, which is not possible with a direct current motor with the same requirement for a defined and constant movement.

In the embodiment selected in the lower left of FIG. 3, the beginning of a display period $Td$ is again indicated by means of a pulse $la$ formed by the interaction of the stylus 40 and the stylus starting contact 79, the stylus operating entirely unsynchronized with respect to the processes in the information storing and processing unit 30. The generated starting pulse $la$ enables a flipflop 80 which itself opens a gate circuit 81 so that from now on the location pulses $ld$ are added to the respective display location values $Dk$ in location counter 25 corresponding to the momentary position of the writing stylus 40. Since, however, the quantization of the display range is assumed to be given, the display location counter 25 furnishes a blocking pulse $ls$ when the display location value $Dq$ of the last display section $ld$ has been reached. This blocking pulse $ls$ is utilized to reset the flipflop 80, causing it to simultaneously produce a zero pulse $ln$ for setting the display location counter 25 to zero. For reasons of completeness only FIG. 3 shows, in the lower left-hand section, the stop pulse $le$ from stylus contact 78 (top of FIG. 2) in dashed lines which now — contrary to the assumption in connection with FIG. 2 — does not act directly on location counter 25 but rather via flipflop 80.

The frequency of the display location pulses $ld$ is preferably selected to be much lower than the frequency with which the individual memory locations of memory 11 pass by read-out access 18. In particular, the frequency of the display location pulses is preferably selected to be sufficiently low so as to assure that during the time interval in which the writing stylus is disposed within each display section $ld$, all of the memory locations are available for a short time at least once at read-out access 18 of memory 11.

As soon as it is determined in digital translator 26 that a momentarily obtained display location value $Dk$ and the associated measuring position identifying or travel time value $Mi$ (or the address $Ai$ representing it) are present at the same time, a gate 82 is closed and the information stored in the respective memory location in memory 11 is released for display, e.g. in the embodiment of FIG. 3, via a digital/analog converter 28. In the simplest case described in connection with FIG. 1, this translator 26 is a digital number comparator which associates a given number of measuring position identifying values $Mi$ to a given number of display location values $Dk$. Since in the present example the measured value $mi$ is initially to be represented only by the value $Mi$ which is a running time variable, and which itself does not contain any information other than the time of arrival of a bottom echo signal $Be$ within a measuring period $Lm$, it is sufficient in this case to realize this digital/analog converter 28 by a switch 83 (see FIG. 2) which switches a writing voltage source 84 via contact rail 41 to the writing stylus 40 and thus produces on the current-sensitive recording strip 20 a short marking 42 in a known manner in the display section $ld$ associated to this measuring position identifying value $Mi$ and given by display location value $Dk$.

A comparison value discriminater circuit 85 assures that translator 26 has access to only such addresses A$i$ whose memory contents has been confirmed as being usable and which are to be read out of memory 11 for display, e.g. only those with a comparison value I/opt.

As already mentioned above it is now possible, according to the present invention, in view of the independence between the measuring periods L$m$ and the display periods L$d$, to vary the type of the respective display very freely during the display periods L$d$ without any changes in the mechanism. The strong dependency between repetition frequency of the transmitted signals S$e$, the travel time of the sound through the measuring path 36 and the speed of the writing stylus 40 over a given display range L$d$ as previously encountered in the echograph art is no longer required with the information processing unit 30 according to the present invention since the unit 30 reads out the information contained in memory 11 only when the writing stylus 40 is passing over the recording strip 20 exactly at the appropriate location.

For the above-mentioned technical reasons, as also mentioned earlier, it was not advisable, when using electromechanical recording devices 19, to switch the momentary measuring ranges very often and it was not possible to drive the variations in the range selection beyond a certain ratio.

Such limitations for electromechanical reasons are, however, no longer required when the present invention is applied in conjunction with conventional recording devices 19 since the drive for the moving parts of, for example, an echograph 38 need no longer be changed. The selection of the measuring range (number of control pulses T$s$ to be counted per section of measuring path 36) occurs simply by switching translator 26 (see FIG. 1) or divider 60 for the control pulses T$s$ (in FIG. 3) and, independent thereof, a display section selector 89 (to be discussed below) selects from a suitable number of sections in the entire measuring range that portion which is to be displayed. Additionally a switch 87 connected between clock pulse generator 12 and counter 14 in FIG. 3 for switching on a logarithmically acting pulse frequency divider 88 provides for the possibility, which was previously discussed, of displaying the measured values on a logarithmic scale, in that during each measuring period L$m$ the repetition frequency of the control clock pulses T$s$ counted into the counter 14 is reduced in a logarithmic manner from a given starting value. Without significant additional expenditures, the possibility is thus provided with a device according to the present invention of obtaining a clear representation of all possible measuring dimensions in a single image with a sliding transition and optimum utilization of the display range L$d$. With a short measuring path 36, i.e. when there is the danger of contact with the bottom 31, for example, by a ship (surveying vessel 37 in FIG. 2) the measuring period L$m$ is short and comprises a rapid sequence of control pulses T$s$ from control clock pulse generator 12 which is adapted to a resolution approximately in the decimeter range. During subsequent travel in the water of a channel, the pulse sequence predominantly corresponds, during a major portion of the now longer measuring path 36, to a resolution approximately in the meter range. Over the continental shelf, the measuring path 36 is again longer by an order of magnitude and the measuring period L$m$ ends with a pulse sequence during which the transmitted signal S$e$ traverses several tens of meters in the transmitting medium etc., with further reduced repetition frequency at high sea and finally over deep sea troughs.

Since the entire measuring range can thus be very freely varied and since within each selected measuring range it is advisably possible to select partial sections for the display, there results a large number of combinations of possible momentary scales and display ranges. In order to be able, in spite of this plurality of given possibilities for different measuring ranges and partial display sections selected therefrom, to obtain an unambiguous interpretation of the available measured values $mi$, the present invention also comprises a particularly advantageous circuit arrangement for controlling the information storing and processing unit 30 in dependence on the momentary selection of one of the many possible ranges, which will be explained below in particular with the further aid of FIGS. 4$a$/4$b$ and 5 for a special embodiment. A divider switch 86 for translator 26 in FIG. 3 (corresponding to the function of selector switch 29 in FIG. 1) is assumed not to be present in the further considerations. It is further assumed that divider 60 is so adjusted that each control clock pulse T$s$ corresponds to a distance of 1/256 meters within measuring path 36, and that the primary counter 61$a$ in counter 14 can thus just add, with a dimension of 10 bits, the number of control clock pulses T$s$ representative of a distance of two meters.

Figure 5:
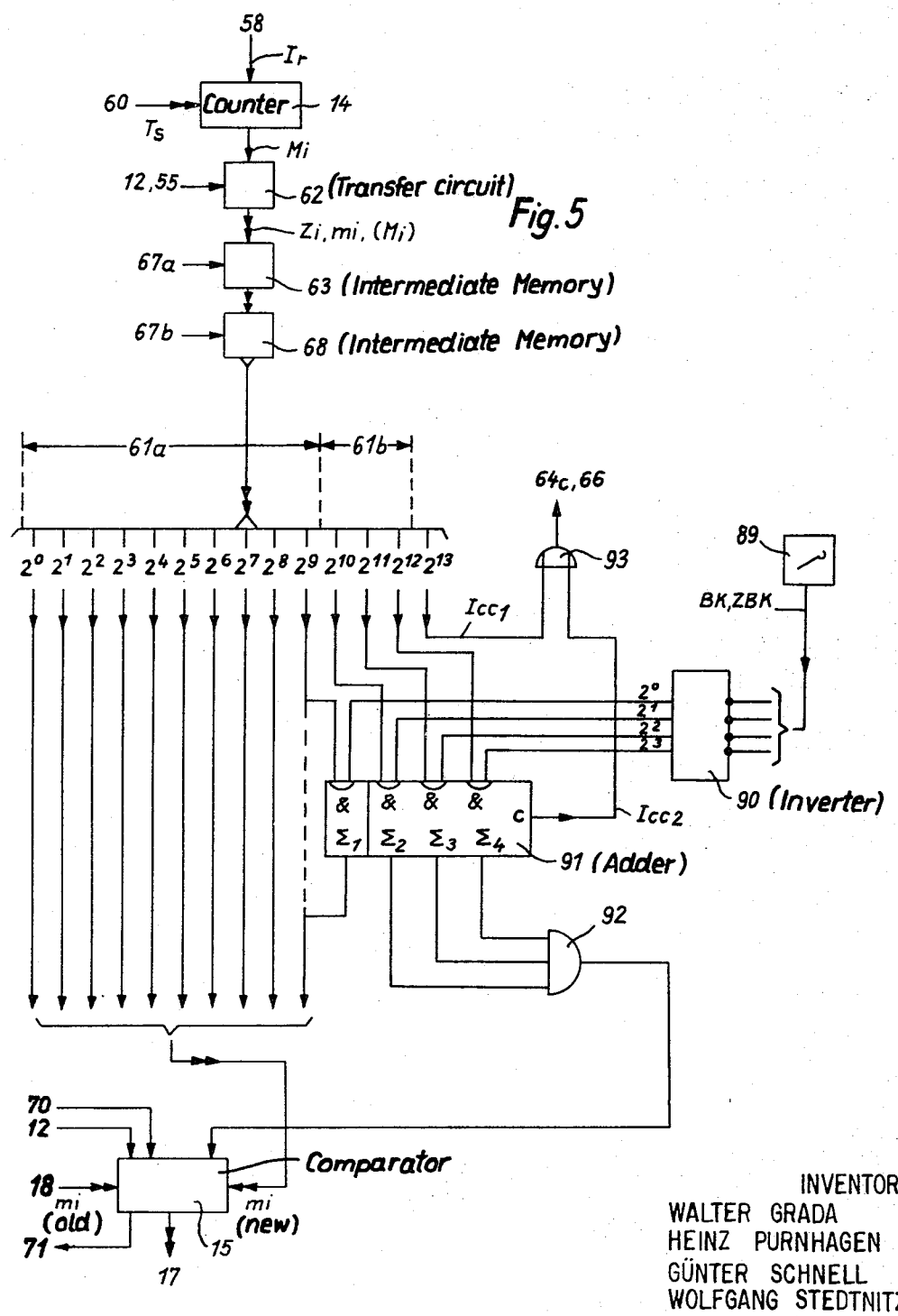
FIG. 5 is a schematic block diagram of a circuit for the selection of the display sections according to FIG. 4a and for the logic linkages according to FIGS. 4a and 4b.

With this arrangement, primary counter 61$a$ is filled as soon as the transmitted signal S$e$ has passed through a section of the length of 2 meters within the measuring path 36 during a measuring period L$m$. However, counter 14 contains, in addition to the primary counter 61$a$, which — in this embodiment — has a capacity of 10 bits, a carry counter 61$b$ which is assumed to have a capacity of 4 bits. The carry pulses Ic from primary counter 61$a$ are first counted into carry counter 61$b$ (see FIG. 4$a$) so that its position always indicates how often partial distances of two meters have been passed through. Only after primary counter 61$a$ has run through its cycle 16 times are the three first locations of carry counter 61$b$ counted full and the final carry pulse Icc$l$ generated which, in the manner described above, resets the flipflop stage 58 when the measurement sequence selection switch 64 is in position c or d (FIGS. 3 and 5). The measuring period L$m$ is thus finally terminated independent of the arrival of a bottom echo signal B$e$. Thus the entire measuring range L$m$ as covered according to FIG. 4$a$ consists of 16 partial sections or ranges of 2 meters each; and the length of the measuring period L$m$ is thus 32 meters.

However, in order to obtain a large-scale display of details of the configuration of bottom 31 on the recording strip 20, according to a further feature of the invention, only two adjacent partial sections are to be displayed at a time. Consequently, in the example under consideration wherein each display section consists of only two adjacent 2-meter partial sections, with a width of, for example, 20 cm for the display range L$d$ (usable width of the recording strip 20) a recording scale of 1 : 20 would be provided. Moreover, in order to avoid the appearance or display of measured values $mi$ exactly at the edge of a display section (e.g. with a set range of 8-12 meters, measured values exactly in the vicinity of 12 meters) as a result of fluctuations in the measuring path 36, according to a further feature for the optimum realization of the method according to the present invention, in addition to the above-mentioned display sections or ranges, additional intermediate display sections, also of two adjacent 2-meter partial sections, are provided. These intermediate display sections are offset, however, with respect to the first mentioned display sections by a 2-meter partial section, e.g., an intermediate range or display section from 10-14 meters as compared to the ranges or display sections from 8-12 meters and from 12-16 meters (see FIG. 4a — left).

The sections and intermediate sections or ranges obtained in this manner are consecutively numbered. Preferably the numbering is such that the sections of 0-4 meters, 4-8 meters,....24-28 meters and 28-32 meters receive the section identifying numbers BK = 1, 3, 5, 7, 9, 11, 13 and 15, respectively, whereas the intermediate sections are appropriately characterized and clearly defined by the intermediate section identifying numbers ZBK = 2, 4, 6, 8, 10, 12, and 14, respectively.

In order to point out more clearly the advantage of such an association and thus the flexibility and possibilities of application for apparatus according to the present invention, a practical example for the effect of the section identifying numbers BK or the intermediate section identifying numbers ZBK and of carry counter 61b according to FIGS. 4a and 4b will be explained.

If it is expected that for a duration of several measuring periods Lm — for example, based on the previously encountered configuration of bottom 31 or based on results of older measurements — measuring values $mi$ are to be obtained from bottom echo signals Be which lie between 8 and 12 meters, then, in order to permit a display of the largest possible scale, it would be desirable to suppress the rest of the measuring path 36 in the display. As indicated in FIG. 4a, measured values $mi$ in this range have the section identifying number BK = 5 associated to them. Consequently, only measuring results in this range are to be considered valid and are to be displayed, and other echo signals, for example, those originating from fish 33, are not to be transferred into memory 11 as measured values $mi$.

As illustrated specifically in FIG. 5 which is a detailed block diagram of a portion of FIG. 3, the section identifying number BK provided by the signal from partial section selector circuit 89, e.g., a normal digital parallel-coding numerical sequence generator, is inverted by means of an inverter network 90 and fed to the respective inputs of an adder 91 to which are also fed the output signal from the highest order digit of the primary counter 61a and the output signals, other than the highest order digit, of the carry counter 61b. The outputs of the adder 91 other than that from the lowest order digit $\Sigma_1$, are connected to an AND gate 92 whose output serves to release the comparator 15. As long as the partial section selector circuit 89 continues to provide a section identifying number BK = 5 whose inverted value is added to the momentarily present number in the carry counter 61b, the condition of an AND gate 92 is met at the output of adder 91 only when the bottom echo signal Be appears while the primary counter 61a happens to be in its fifth or sixth cycle, i.e. when the measured value $mi$ lies in the expected section between 8 and 12 meters. Thus with the given section identifying number signal BK = 5, only during this fifth and sixth cycle of primary counter 61a is comparator 15 released, because in the other cases the measured value $mi$ will not be one that falls in the selected partial sections of measuring range Lm which are the only ones of interest.

The basic idea is thus to continuously subtract the selected section or range identifying number BK, or intermediate section identifying number ZBK, or more accurately to add its inverted value, since a binary-digital subtraction is not directly possible. Thus a simple criterion is obtained as to whether or not an arriving measured value $mi$ — represented by the travel time parameter or measuring position identifying value $Mi$ which defines the measured value $mi$ at the arrival of the bottom echo Be — lies within the range or section selected for the display. The inverted value of the section or intermediate section identifying number BK or ZBK is associated in such a manner with the first 3 bits of carry counter 61b, in this logic arrangement for controlling the comparator 15 so that the unambiguous criterion for the release of the further processing of a measured value $mi$ will appear at the output of AND gate 92 only when the value $mi$ has fallen into the selected range.

The circuit of the present invention as shown in FIG. 5 produces a conversion of the 12-digit measured value $mi$ as it is originally present in counter 14 into a 9-bit memory value which contains measured value $mi$ and the momentarily selected display range or section. This not only reduces the expenditures for signal processing starting from comparator 15 but the selected measuring range is also automatically considered during the display, i.e. the actual measured value $mi$ is again sorted out for which purpose only the actual momentary position of writing stylus 40 must be considered.

The numerical example in FIG. 4b for the section identifying number BK=5 clarifies this effect in combination with the table of FIG. 4a and the detailed circuit diagram of FIG. 5. If the measured value $mi$ appears earlier than would correspond to the section with the selected section identifying number BK, it is not considered at all since comparator 15 is not released by the output signal from AND gate 92. Counter 14 then continues to count until the selected section with the section identifying number BK = 5 has been completely traversed and a carry pulse Icc2 results at adder 91, which then terminates, via an OR gate 93, in a manner already described in principle, via the measurement sequence selector switch 64, the present measuring period Lm and starts a new measuring period Lm+1, if required, in position c or d of the measurement sequence selector switch 64.

If the bottom echo signal Be appears too late, i.e. if the measured value $mi$ lies neither before nor in the selected range, the measuring period Lm is terminated in the same manner by the carry pulse Icc2 from adder 91 (see the dual numerical example in FIG. 4b).

If the very last section with the section identifying number BK = 15 were selected, no carry signal Icc2 could appear at adder 91, as can be seen in FIG. 4a. In order to still terminate the measuring period Lm and clear the start for a new measuring period Lm+1, the additional fourth bit location is provided in carry counter $61b$ (location for numerical value $2^{13}$ in counter 14 or fourth bit in the carry counter $61b$, respectively). This fourth bit location takes on a "1" state after passage of so many control clock pulses $Ts$ that counter 14 is also fully counted out for the last partial sections and controls, as the above-mentioned carry pulse $Icc1$, the OR gate 93 to finally terminate the momentary measuring period $Lm$.

Figure 6:
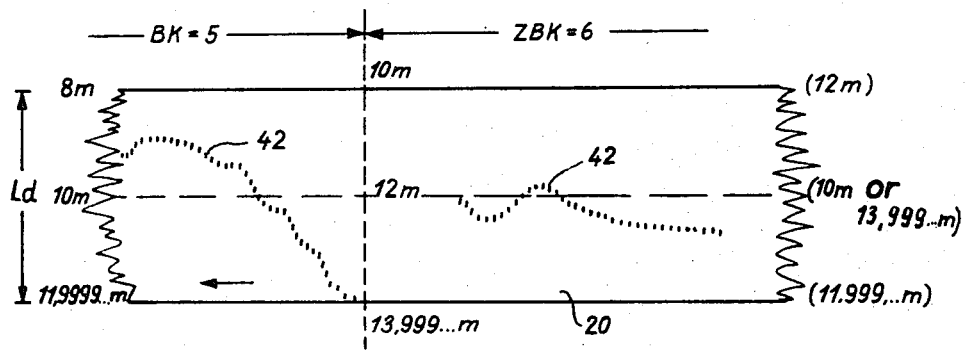
FIG. 6 shows a recording made according to the invention on the recording strip as an example of the effect of selection of preferred regions for the entire display.

If the measured value $mi$ moves toward the border of a range or section represented by a section identifying number BK, as shown in the left half of FIG. 6 for markings 42 of the bottom 31 of a sounded body of water 32 (FIG. 2), i.e. for increases in the measured value $mi$ of measuring path 36 with BK = 5, such as measured values $mi$ near 12 meters, it is advisable to switch (see FIG. 4a) to the next intermediate section or range, i.e., the intermediate section having the intermediate section identifying number ZBK = 6 as illustrated on the right in FIG. 6. Without any change in the display scale and without any change in the mode of operation of the display apparatus (echograph 38 in FIG. 2) this again produces an unambiguous and continuous display of the measured values $mi$. It is thus only necessary to select, e.g. by hand, a new numerical value for the section identifying number BK or the intermediate section identifying number ZBK in the form of a digitally coded number via a partial section selector circuit 89.

Before turning to other variations and modifications of the invention, one further feature of the invention and in particular, the reason for connecting the output of the last bit location of primary counter $61a$, i.e. bit location $2^9$, to the lowest order bit location $\Sigma_1$ of adder 91 should be discussed. If the direct connection shown in dashed lines in FIG. 5 for the last bit of primary counter $61a$ were utilized, the situation would result that, according to the requirements for BK = 5, the indication for 10 meters would continue to fall in the center of the recording strip 20 even for the intermediate section identifying number ZBK = 6 as is shown in parentheses on the extreme right of FIG. 6. The path of the markings 42 would then extend from the center downward as the measured value varied between 10 and 12 meters and would then jump to the upper edge of the display range $Ld$ on the recording strip 20 from where it would then extend again toward the center between 12 and 14 meters, so that now a marking disposed in the center of the recording strip 20 would correspond to the beginning of the next section or range having the section identifying number BK = 7. Because such a jumping display is inadvisable since it makes the evaluation more difficult, according to a further feature of the present invention the last bit from the primary counter 61 is switched to the free input of adder 91 and is added, as shown in FIG. 5, to the inverse value of the lowest valued digit of the section or intermediate section identifying numbers BK or ZBK, respectively, so that the first digit of the sum for the first partial section of any desired section, i.e. for the location of the numerical value $2^{10}$ at comparator 15, must always result in a "0", and in the second half always in a "1" (see FIG. 4b). Thus all set partial sections and intermediate partial sections uniformly extend from the upper to the lower end of the display range $Ld$ as is shown in the center of FIG. 6 for switching from one partial section to another.

Since the section or intermediate section identifying numbers BK or ZBK furnished by the partial section selector circuit 89 represent only an electronically reproduceable binary sequence of digits, they may also be simply produced or varied by the circuit for processing the measured values. Thus it is possible, for example, to automatically always select the optimum range for the momentary display at a large scale if an independent rough measurement — perhaps by means of continuous counting of a fraction of the control clock pulses $Ts$ from clock pulse generator 12 in parallel with the accurate processing in counter 14 of the information processing unit 30 — always resets the optimum display range. With each change of section, however, the entire contents of memory 11 must be erased since the result from the other section which is still contained therein would no longer meet the new requirements of AND gate 92 because of the coupling of the section indication with the measured value $mi$, so that a restriction against too frequent switching is advisable.

Another variation in connection with the automatic range switching is to switch ranges as soon as the measured value $mi$ approaches, within given tolerances, the upper or lower limit of the presently set range, i.e. in the case of FIG. 6 a change from BK = 5 to ZBK = 6.

With the multitude of possible and often occurring changes of range it is advantageous for the observer of the displayed measured values mi (and is particularly required for automatic further processing, e.g. in connection with results that are punched on tapes instead of being recorded on a recording strip 20) to additionally indicate the measuring range belonging to a particular recording. For this purpose it is possible, for example with the use of the translator 26a of FIG. 1, to reserve a section on the recording strip 20 on which no markings 42 of measured values $mi$ will be placed and to here list such indications as the momentary measuring range. When the measured values mi are punched on punched perforation carriers, the momentarily applicable measuring range would be correspondingly noted either before or after a column of perforations for the measured values mi.

The automatic registration of the momentary measuring range is accomplished, according to a preferred embodiment of the present invention, by a range of section writer 94 (FIG. 2) which is controlled by partial section selector 89 and which writes a coded indication or a clear indication of the momentarily set section identifying number BK or intermediate section identifying number ZBK or even, after appropriate preprogramming within section writer 94, the numerical limits of the actual measuring range into a portion of display range $Ld$ reserved for this purpose by translator 26 over a plurality of adjacent columns 21, for example, coded in line elements. It would here then be advisable to assure that a switching between different sections or partial ranges occurs only when a minimum number of columns 21 corresponding to the required number for the display at this scale has been passed. In order to keep this minimum number small, it is advisable to write the clear text notations in a vertical manner, i.e. transverse to the longitudinal and conveying direction of the recording strip 20. Moreover, care should be taken that after each switching of ranges the momentary measuring range is immediately written out which is then repeated at regular intervals at least once during the portion of recording strip 20 which is visible on the echograph 38. In order to permit the finding of a favorable range during operation by switching between ranges and without the need for a plurality of measuring periods Lm and thus a plurality of columns 21 having to be passed through, a blocking key 95 is provided. When actuated, this key 95 disables the function of the range writer 94.

Following the description above of the basic concept of the present invention, of a basic circuit and of exemplary detailed embodiments of the present invention, particularly advantageous further developments will now be outlined with a view toward particular fields of application. Bottom echo signals Be, Be 1, Be 2, ... originating from different layers of the bottom 31 of a body of water 32 were previously mentioned. It is known to produce differently based bottom echo signals Be and Be 1, Be 2... by transmitting signals Se of different fundamental frequencies. In order to apply the above-mentioned possibility of comparing a particular bottom echo signal Be with a signal Be 1 regarding identify or comparison determination, FIG. 2 shows the additionally provided fundamental frequency discriminator 96 which consists, for example, of a simple frequency filter and produces a frequency identifying marker in dependence on the fundamental frequency of the bottom echo signals Be, Be 1, Be 2, ... as the additional information Zi. This marker is then processed together with the momentary measured value mi. For the case of two fundamental frequencies, which is predominantly employed in the surveying of bodies of water, only a single bit is required whose state indicates to which fundamental frequency a momentary measured value mi relates. The comparator 15 is then appropriately so designed that it compares only measured values mi with the same frequency identifying marker as the additional informations Zi. Thus a confirmation regarding an older measured value cannot occur when the double value of the bottom echo signal Be accidently coincides with a regular bottom echo signal Be 1 since this has a different fundamental frequency. To further safeguard against erroneous measurements it is advisable to provide, in this connection, further additional informations Zi which are used for the functioning of comparator 15 to assure that during the surveying of bodies of water in partial sections of measuring paths 36, which sections are not very deep, i. e. when there is not too much attenuation, the measured values mi with the higher fundamental frequency are smaller than the measured values mi with the lower fundamental frequency in the same measuring period Lm.

The filtering out of interfering echoes should advisably occur to a certain extent even before the signals are processed in conjunction with memory 11. This can be done, for example, by means of a comparison between the transmitted signal Se and the bottom echo signal Be in a pulse length comparator 97 (FIG. 2) which then releases the transfer circuit 62 (FIG. 3) only when there is sufficient coincidence.

A further advantageous modification of the embodiments of the present invention described above is that a typical measured value mi in each measuring period Lm, for example each first strong bottom echo signal Be, is provided with a special marker as the additional information Zi and is transmitted, in parallel with the above-described measured value processing, after the comparator 15 and the identity block 85 become effective, to a known digital slave indicator (not shown) since every measured value is already present in a suitable code.

Another frequent problem which can be solved advantageously with a further development of the present invention is an indication of the length of the respective bottom echo signals Be, Be 1, Be 2, ... from which indication the art-skilled can derive much useful information about the possible configuration of the bottom 31 of a body of water 32. One possibility for solving this additional problem of obtaining further information is by the addition to the embodiment of FIG. 3 of a transfer gate 98b which is enabled or controlled via an echo end indicator 98a, for example a normal potential-controlled multivibrator stage (Schmitt trigger) at that moment when the amplitude of the momentary bottom echo signal Be falls below a given limit value. The enabling of the gate 98b causes the count then present in the continuously counting counter 14a to be transferred for further processing into the transfer circuit 62 in the form of a further measuring position identifying or travel time value Mi as additional information Zi in parallel with the measured value mi, or as the interesting measured value mi itself in parallel with the travel time value Mi for the beginning of the bottom echo signal Be. It is a question of the circuit design of comparator 15 in each particular case whether the identity comparison between old and new measured values mi in this case refers only to the beginning of a bottom echo signal Be and thus to the value Mi or only to the length of the bottom echo signal Be and thus to the difference between the values Mi for the beginning and end of the bottom echo signal Be or to both of these criteria.

Figure 8:
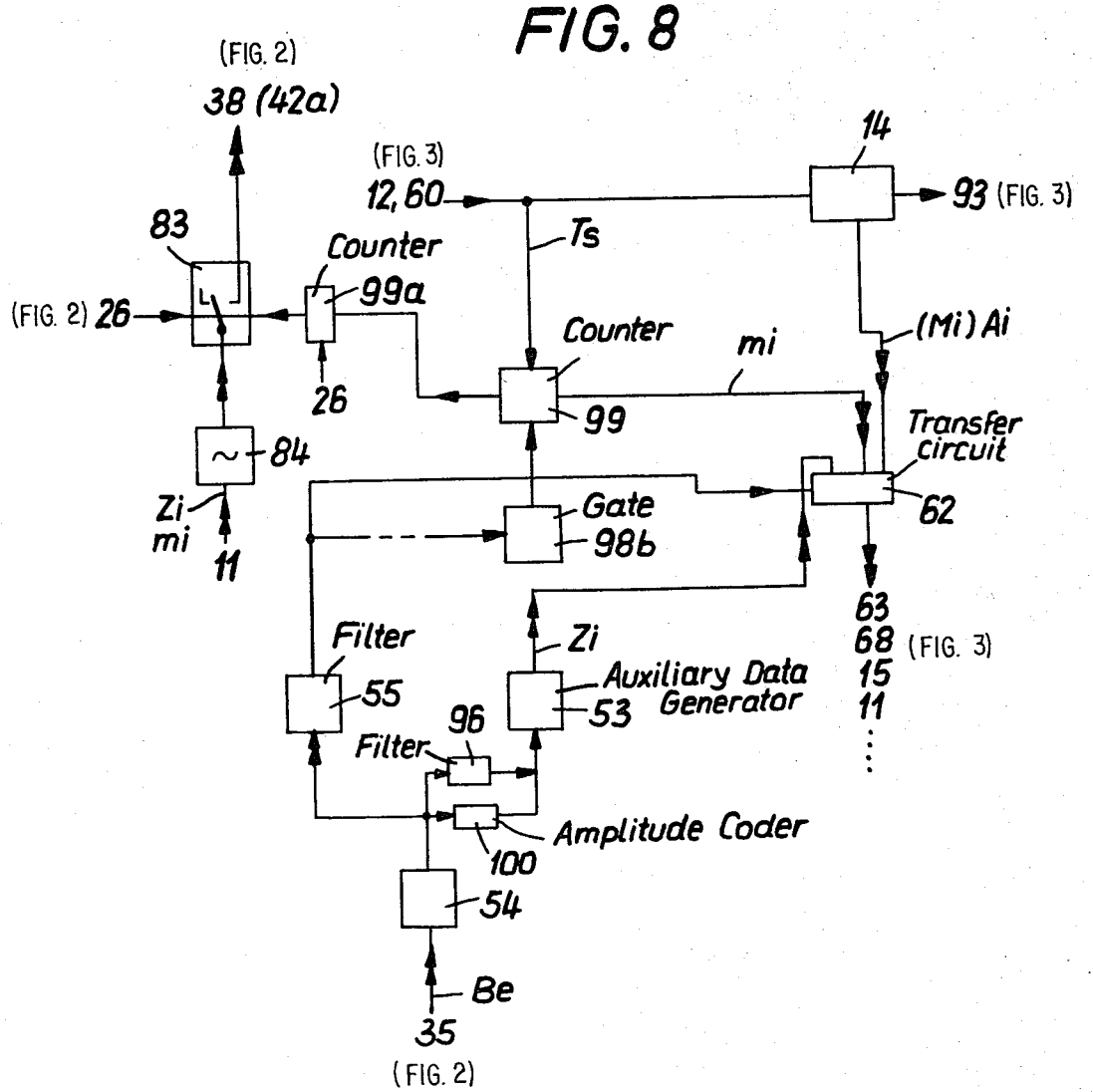
FIG. 8 is a block diagram of a modification of FIGS. 2 and 3 for controlling the data input gate to the recorder.

FIG. 8 illustrates a different circuit alternative for the solution of the same problem which compared to the above-discussed solution exhibits certain advantages regarding the circuitry employed. In this case a separate bottom echo duration counter 99 is controlled via the output of gate 98b to stop its count as soon as a bottom echo signal Be, Be 1, Be 2, ... is detected. The counting pulses are the pulses Ts from the control clock pulse generator 12 at the input of the counter 14. The result from the bottom echo duration counter 99 is processed, at the moment when the bottom echo Be dies out, together with travel time value Mi which now functions as the address parameter Ai for the beginning of the bottom echo signal Be to form the measured value mi, i.e. it is fed into transfer circuit 62. It is now again only a question of the concept presently desired for comparator 15, whether it is based only on the address parameters Ai or on other parts of the contents of memory 11, particularly this measured value mi.

In the last-mentioned cases the switch 83 (FIG. 2) through which the data to be reproduced is fed to the stylus 40 is provided with a bistable characteristic. At the beginning of each bottom echo signal Be to be registered for each display period Td the switch 83 is closed via translator 26 in a manner described earlier.

When the additional information $Zi$ represents the travel time value $Mi$ from the end of the bottom echo signal $Be$, the switch 83 is reopened when there is renewed coincidence $Dk = Mi = Zi$, or as illustrated, is reopened by the output signal from a backward counting bottom echo duration counter 99a, into which the result of the bottom echo duration counter 99 was fed at the beginning of the display after the duration of the bottom echo signal $Be$ has been counted off. The resulting markings on the recording strip 20 will then not be the markings 42 shown in the left-hand portion of FIG. 2 but rather the markings 42a shown in solid lines on the right corresponding with the respective length of the bottom echo signal $Be$.

To further increase the information content when changing between measured value storing and reproducing, the quantitive information about the course of the bottom echo signals $Be$, in addition to the beginning and the length thereof, should be considered. Particularly when the conventional use is made of recording strips 20 of a current-sensitive paper for which it is known that the dynamic between just discernable gray tones of a recording and deepest blackening of the markings 42 is not very large, it is sufficient, within the scope of the present invention, to perform a relatively rough quantization of the amplitude variation of the bottom echo signal $Be$ as it preferably appears at the output of the receiver amplifier 54 and before filtering by the filter circuit 55. Only such amplitude variations of bottom echo signal $Be$ which are quantized in an amplitude coder 100 (FIG. 2) and which are digitally emitted are then considered, if required, as the additional information $Zi$ which is applicable, based on the output signal at the filter circuit 55, as being a useful bottom echo signal $Be$. The amplitude coder 100, in the simplest case, may be a known scanning and holding circuit for converting an analog signal sequence into a step function with a memory-type digital circuit connected thereto, the circuit requiring only a very small bit capacity because of the small number of different amplitude values which need be evaluated. During the reproduction of the measured values, the additional information $Zi$ thus derived for each bottom echo signal $Be$ is utilized to control the output amplitude of the writing voltage source 84 so that tracks of the bottom echo signals $Be$ result on the recording strip 20 which have different degrees of blackening, thus producing a coarse reproduction of the quantitative amplitude variations of the bottom echo signal $Be$, i.e. useful additional informations.

Figure 7:
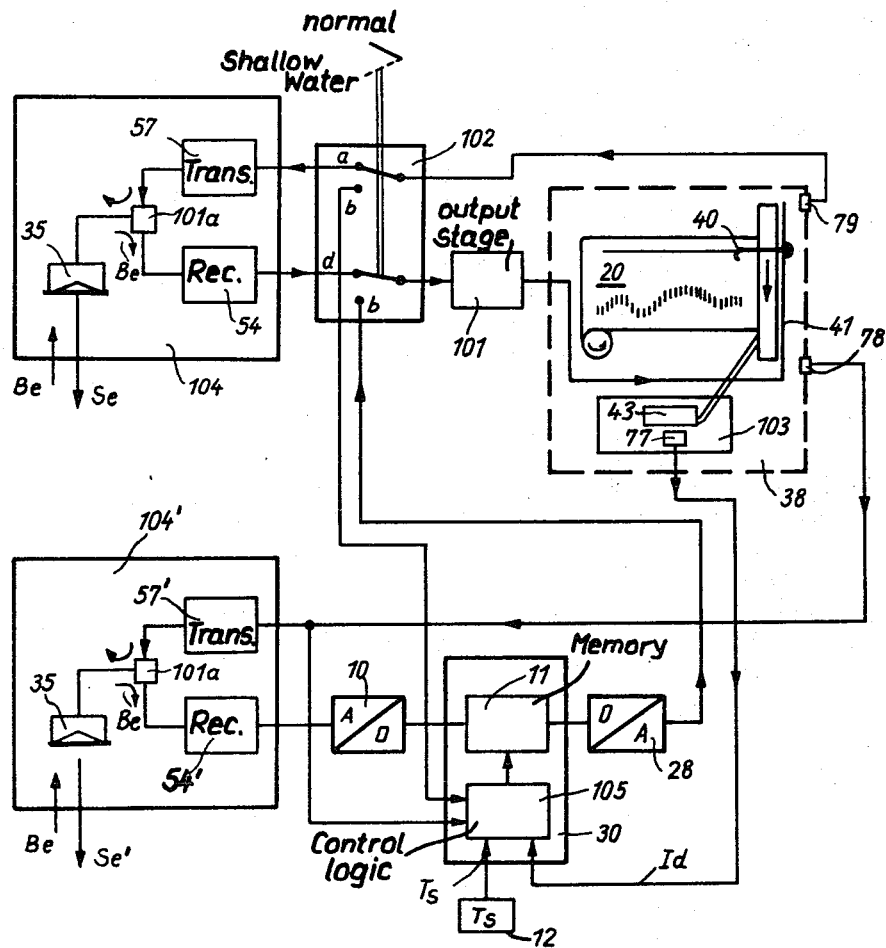
FIG. 7 is a block circuit diagram of an embodiment of the present invention which requires very little circuitry for the present invention in the form of an economically priced supplemental instrument for use with conventional depth sounders in shallow water areas.

The arrangement shown in FIG. 7 is an abstraction of the previously described possibilities of the present invention regarding a quite specific case of application, i.e. the conventional electromechanical navigation echographs whose measuring ranges usually lie in the order of magnitude, for example, of between 100 and 1,000 meters. With an additional device according to the present invention which can be produced with a minimum of expenditures it is possible to also cover measuring ranges in the order of magnitude of only 5 or 10 meters with the same electromechanical and high-frequency devices already available on board ship. As is known, the writing navigation or surveying echo sounders previously switched to a shallow water range by increasing the speed of the writing stylus 40 corresponding to the then enlarged scale and with the known speed of sound in water as the proportionality factor. As already mentioned elsewhere, this measure, however, requires increased mechanical expenditures for the echograph 38 and is limited by the wear on the writing stylus 40, the permissible power input of the gear mechanism contained in the drive mechanism 50 (FIG. 2), e. g. reduction gear 51, as well as by the power output of the recorder output stage 101. In general, however, the limiting factors are the life of the gear assembly and the wear of the stylus 40. Extreme switches of this type also interfere with the recognizability of the recorded markings 42 which are very indistinct with a high speed of the writing stylus, whereas a very slow speed leads to an increase in burn-off and unclean echograms. With these known echographs 38, measuring range limits in the order of magnitude of about 10 to 20 meters could thus not be exceeded in practice.

In FIG. 7, the position $a$ of the operational mode switch 102 represents the conditions for the conventional use of such echographs 38 with speed-controlled drive means 103. The transmitter 57 is triggered, via the stylus starting contact 79, to emit a signal $Se$ with a fundamental frequency of, e.g., 30 kHz through a transducer 35. At the receiving end, the bottom echo signal $Be$ detected by the transducer 35 is fed via switch 101a commonly used in the echo sounding art, a receiving amplifier 54, the recorder output stage 101 and the recorder contact rail 41 to the writing stylus 40 so as to provide a marking on the recording strip 20.

According to the invention, when the operational mode switch 102 is switched to position $b$ for echo sounding in the shallow water range, a transmitting receiving circuit 104' for substantially higher fundamental frequencies of the transmitted signals $Se$ is connected to the echograph or recorder 38. The transmitter 37' is now triggered by a signal from the stylus end contact 78 as soon as the stylus 40 has passed over recording strip 20 to emit the higher frequency signal $Se'$ via the transducer 35'. In this mode of operation, instead of feeding the received bottom echo signal $Be'$ appearing at the output of receiver amplifier 54' to the output stage 101, the signal $Be'$ is first read into memory 11, if required under consideration of the amplitude variations after conversion in an analog/digital converter 10. The high speed of storing the amplitude variations in the memory 11 corresponds to the shortness of the measuring range. This speed, however, is not critical, since the entire operation is a purely electronical control sequence. As soon as the writing stylus 40 begins recording in a new column on recording strip 20, read out of the memory 11 is initiated via a signal from the stylus starting contact 79 and at a speed corresponding to the actual movement of the writing stylus 40 over recording strip 20 without a change being necessary in the construction of the echograph 38 with respect to its original intended use over a 100-meter measuring range.

To show the amplitude variations, the contents of memory 11 are switched to the recorder output stage 101 via the digital/analog converter 28. It is not necessary to discuss in detail for this special case the internal circuitry of the information processing unit 30 which is shown in FIG. 7 as being included in a control logic 105. Translator 26 in the original configuration (FIG. 1 or FIG. 3) can now be eliminated since the writing stylus 40 now directly controls the readout from memory 11 successively for each individual memory location as they are associated to the sequence of adjacent display sections l$d$. Only after the entire contents of memory 11 has been read out and recorded, i.e. after recording strip 20 has been traversed, is transmitting circuit 104' newly triggered and renewed storage of a new amplitude train for a bottom echo signal B$e'$ into the now empty memory 11 initiated. Each memory location is now directly assigned to a display section l$d$.

Since according to FIG. 7 the entire amplitude train from the bottom echo signals B$e'$ of the covered measuring range (measuring period L$m$) is being recorded, an unnecessarily large number of memory locations in memory 11 are empty. It is thus a question of optimum use for the respective individual case, whether this is acceptable or whether an additional echo comparison logic should be provided to reduce the size of memory 11, as was described in connection with FIG. 3.

To use the supplemental shallow water device according to FIG. 7 with available navigation echographs, i.e. without the desire of reproduceable details such as might be required for accurate surveying, it is sufficient to record only a single amplitude stage on the recording strip 20, i.e. only the presence or nonpresence of a bottom echo signal B$e'$. The space requirement in the memory and thus the extent of the memory circuit 11 can thus be substantially reduced, and the analog/digital converter 10 and digital/analog converter 28 can be eliminated thus further reducing the cost of the installation. In particular, the number of memory locations in memory 11 is then determined only by the desired resolution of the depth measurement, for example 500 bit per measuring range, i.e. the width of recording strip 20. When modern technology is employed, i.e. when static MOS shift registers are used for memory 11, this provides the best-buy solution in this respect, particularly when compared with the additional electronic devices required for a selector logic as was described in connection with FIG. 3 so that the measuring result can be optimally displayed over the entire width of the recording strip.

When employing this supplemental device with conventional echographs 38, any desired small measuring range can be clearly reproduced with accuracy. It is thus a question of the required or justifiable expenditures to what extent the simple embodiment of FIG. 7 is supplemented in a direction toward more complicated devices which are able to solve other problems, such as described for example in FIG. 3.

Finally different types of application and modification of the invention as described herein, particularly with respect to the echo sounding art in deep-sea fishing but also with respect to surveying of bodies of water, are to be mentioned. The modifications to be discussed below can be realized very advantageously with the present invention and often only with quite considerable expenditures when employing only known prior art methods.

Although recorders of writing devices which operate according to the start-stop principle, i.e. discontinuously, are known in the echo sounding art, the continuously operating echograph 38 has found more acceptance because of the dynamically most favorable conditions due to constant rotational movement. Because, according to the present invention, no coupling whatsoever any longer exists between the measured value compilation and the reproduction of the measured values, i.e., between transmission of a pulse S$e$ and the writing stylus 40 driven at a constant speed, it has become possible to control the actuation of transducer 35 entirely independently of echograph 38, e.g. always at that point when with rough seas the surveying vessel 37 is aligned actually horizontally via an inclination indicator 106 (FIG. 2) or when the surveying vessel 37 is just passing through a center position between wave peak and wave trough as determined by a lift accelerometer 106$a$ (FIG. 2). Since these favorable triggering moments cannot be synchronized with the known echographs 38 because they function with the continuous operation of the writing stylus 40, the influences of high seas and of rolling and pitching of a surveying vessel 37 were entered into the measuring result as interfering parameters. Such interfering parameters can be practically eliminated with the use of the present invention by the triggering of a transmitter 57 at the proper moment, since all measured values $mi$ are compiled and stored with reference to a normal situation before they are read out of memory 11 — entirely independent of the conditions on measuring path 36.

Another possibility for eliminating the influence of heavy seas on the measuring result provided by the present invention consists in varying the repetition frequency of the pulses T$s$ from control clock pulse generator 12 present at the input of counter 14 in a direction opposite to that of the momentary lifting process.

Additional possibilities of significance are provided by the present invention in connection with conventional recording devices when a comparator 26$d$ (bottom of FIG. 1) is provided which associates the measuring position identifying or travel time values M$i$ and the display location values D$k$ to each other in an inverted sequence so that display sections l$d$ show increasing display location values D$k$ with decreasing travel time values M$i$. In spite of unchanged direction of movement of marker 22 this results in a display of measured values $mi$ in an inverse direction, that is from the bottom of the recording strip 20 toward the top instead of from the top toward the bottom as in the previous considerations. In the simplified embodiment of FIG. 7 in which no comparator 26 is required since during reading out of memory 11, as soon as writing stylus 40 has passed over the stylus starting contact 79, one further location is scanned in memory 11 with each display location pulse l$d$ from drive 103 and the next memory location is read out, the corresponding effect can be obtained by inverting the shift direction of the memory circuit, i.e. the time direction of the read-out process is reversed.

This inversion need not extend over the entire display period T$d$ of the display range L$d$, it may start during one particular display period T$d$. Such a case of measuring paths which extend in the opposite direction is present, for example, in deep-sea fishing. The respective circumstances are indicated in FIG. 2 by a submerged sounding station 107 disposed at towed net 34 from where soundings L1 are made at larger time intervals upwardly to determine the depth of the net 34 with respect to the surface 108 of the water 32 whereas the downwardly directed soundings L2 occur at a correspondingly smaller scale to determine the approximate distance of the towed net 34 from the bottom 31. Furthermore, upwardly and downwardly directed soundings are appropriate in the immediate vicinity of the net to determine the position of fish 33 not caught by the net 34. A device for recording these measurements in different directions and with different measuring ranges but still on a single recording strip 20 in an intelligible manner is known and is a special embodiment of an echograph in which the direction of movement of the writing stylus 40 is reversed in adjacent columns 21. The mechanical solution for the required movements in the known recording device is not required however when the present invention is employed because the stored measured values $mi$ are then simply incorporated into the evaluation of the measured value $mi$, before they are displayed by appropriate association with the display sections $ld$ within the display range $Ld$ without any changes in the function of the conventional echograph 38 being required.

The respective principle is also of significance for the surveying art, for example, when the configuration of the bottom 31 of deep-sea areas, is surveyed and the finest possible resolution is desired, i.e. an accurate surveying result. The submerged sounding station 107 in this case is, for example, a towed probe, which is controlled at a constant depth and as close as possible to the bottom by means of upwardly directed periodic soundings L1. This depth need not be offered at a particularly large scale since it is constant per definition. It is assumed that the depth measurements are represented by the spacing between the two upper ends of the two markings 42 at the top of the recording strip 20 in FIG. 2 and may correspond to an actual depth of several hundred meters. Of more interest, however, is the actual configuration of the bottom 31 which now can be sensed in the relatively short measuring range for the downwardly directed soundings L2 with centimeter accuracy and displayed on the same recording strip 20 at as large a scale as possible; in the case of FIG. 2, for example, in the form of the lower marking 42. The distance between the upper ends of the center markings and the lower markings 42 is then assumed to be in the order of magnitude of decimeters. When the writing stylus 40 moves along the display range $Ld$, e.g. as shown in FIG. 2 from the top to the bottom, measured values L1 for upwardly directed soundings are first displayed at a smaller scale and with an inverse association between display location values $Dk$ and travel time or measuring position identifying values $Mi$ for measured values $mi$. The system is then switched for the remainder of the display range to the direct association for the largest possible scale display without having to influence the mechanical functions of the echograph 38 in any manner whatsoever.

The last-mentioned case that a measured value $mi$ be composed of a known and perhaps even constant component and a continuously varying component occurs quite often in practice as described or in a modified version. For example, this is the case when the transducer 35 is installed in the surveying vessel 37 (FIG. 2) for which the immersion depth 109 can be measured at the surveying vessel 37 itself if it is not given by its construction. It is known in such cases to suppress the actual zero marker during the display — here the surface 108 of the water with respect to the position of the transducer 35 — and to record only the actually covered measuring path 36 on the recording strip 20, somewhat as shown in FIG. 7, without any upper markings. However, this may lead to complications and most of all errors, particularly when the evaluation of the recording strips 20 takes place at a different time and, independent of the conditions of the surveying vessel 37, at another place. It is thus more appropriate to include the surface of the water 108 as a true-to-scale zero line as well as a marker for the immersion depth 109 in the echogram so that the display of marking 42 on recording strip 20 will be of the type as shown in FIG. 2. In the conventional echographs 38, it is known in this connection to move the stylus starting contact 79 from the beginning of the display period $Td$, i.e. from the upper edge of the display range $Ld$, in a direction opposite the direction of movement of the writing stylus 40. This results in a display with a suppressed zero point because when the writing stylus 40 has finally reached the beginning of the display range $Ld$ after transmitter 57 has been started via a signal from stylus starting contact 79, the transmitting pulse $Se$ has already traversed a path which corresponds, for example, to the exact immersion depth 109. For mechanical reasons which can be seen in FIG. 2, it is not possible to advance the stylus starting contact 79 any further than theoretically to directly next to stylus end contact 78 because otherwise no unequivocal display of the measured values $mi$ would be possible. The described case for a deeply towed sounding station 107 can thus not be realized with the conventional stylus contact displacement nor can the measured value alone be determined from surveying vessel 37 for a partial range of interest at a great depth and thus a long measuring path 36. Within the scope of the present invention, however, no limits are placed on a measuring range suppression by means of forward displacement in that the desired range indicated in FIG. 2 in an exemplary manner by the known immersion depth 109 or by the known depth for the upwardly directed soundings L1, is given, e.g. by numerical values, by the output signal from an adjustable range preselector circuit 110. As soon as transmitter 57 is controlled to emit a signal $Se$ — for example, via start key 56 — the output signal from the range preselector circuit 110 sets counter 14 to a starting travel time value $Ma$, from which time on counter 14 continues to count the travel time values $Mi$. Since no restrictive conditions exist between measured value compilation and display, i.e. here with regard to the momentary position of writing stylus 40 at the moment of transmission of pulse $Se$, the number value of the starting travel time value can be of any size. Additionally since the address value $Ai$ which will be read into memory 11 is only the result of the count of control clock pulses $Ts$, the display of the measured values $mi$ no longer shows that this is a given starting travel time value $Ma$ within a measuring period $Lm$, i.e. the display is automatically again related to a zero marker and thus becomes unambiguous. The starting travel time value Ma can also be processed separately as additional information Zi and can be so written, for example, that a display as shown in FIG. 2 again results whose center sequence of markings 42 clearly shows the position of the sounding station 107 or of transducer 35 at an installation depth 109. The given starting travel time value Ma may also be advantageously displayed as a numerical display in clear text, comparable to the partial section or range indication discussed in connection with range writing circuit 94 so that the path of markings 42 only represents the measured values $mi$.

If the use of a range preselector circuit 110 seems to be too expensive, the same result can be obtained, however together with a loss of time, by causing the counter 14 to count to a given value at the beginning of the measuring period Lm and before transmitter 57 is triggered. Since now again the conditions for a change in measuring range are those discussed in connection with FIG. 4a, there again results the display shown in FIG. 6 which has already been described. Thus it is possible according to the invention to single out measuring ranges by means of any desired forward displacement which was not possible thus far by means of mechanical displacement of the stylus contact and variation of the speed of the stylus 40.

A further drawback occurred with the conventional echographs when the measuring path 36 was very long. Aside from the problem of slow stylus drive which has already been discussed, the relatively discontinuous display of the echogram was annoying because a relatively long time elapsed between two adjacent stylus cycle passages.

In the basic circuit according to FIG. 3 this problem can easily be solved since the writing stylus 40 can be driven with any suitable speed, independent of the momentary sounding cycle. For each display section $ld$, i.e. for each momentary position of writing stylus 40, the applicable, properly scaled measured value $mi$ is read out of memory 11 and is displayed, and if no new measured value $mi+1$ from a newer measuring period $Lm+1$ is present, the previous measured value $mi$ is still applicable. Since this value is thus written out several times, there again results a clear echogram. The constant and optimally selectable stylus speed leads to a uniformly blackened display. This corresponds to a still picture when the measured value display is given on the screen of a cathode-ray tube instead of on an echograph 38.

It will be understood that the above description of the present invention is susceptible to various modifications, changes and adaptations, and the same are intended to be comprehended within the meaning and range of equivalents of the appended claims.

We claim:

1. A method for compiling, evaluating, displaying and/or recording, preferably for displaying and/or recording in the form of a columnar arrangement, measured values ($mi$) obtained during a measuring period ($Lm$) within a sequence of measuring periods and dependent on a given independent variable (P), wherein the measuring period ($Lm$) and the displaying and/or recording period (hereinafter uniformly called the display period $Td$) take place independent of one another, so that the display and/or recording can take place, if required, at another location and at another time than where the measured values were compiled, comprising: quantizing the independent variable (P) of the measuring period ($Lm$) and associating a measuring position identifying value ($Mi$, where $i = 0-p$) with each of the resulting measuring intervals ($lm$); quantizing the measured values ($mi$) of a measuring period ($Lm$) which has been started at any desired point in time with respect to the momentary conditions of a display period ($Td$); writing the quantized measured values ($mi$) from each measuring period ($Lm$) into a memory circuit utilizing the values $Mi$ as memory address values ($Ai$); quantizing a given display range ($Ld$) and associating a display location value ($DK$, where $K = 0-q$) with each of the resulting display sections ($ld$); establishing a predetermined association between the values $MMi$ and $DK$; for each consecutive display location value $DK$ occurring during a display period ($Td$) started at any desired point in time with respect to the momentary conditions of a measuring period ($Lm$), reading out the information stored in the memory having an identifying value $Mi$ unequivocally associated therewith, said reading-out taking place with a constant read-out timing frequency of a substantially smaller order of magnitude than the freely variable write-in timing frequency employed; and displaying the information read out of the memory in the associated locations of the display range.

2. The method of claim 1 wherein said measuring location identifying values are running time values of the measuring period $Lm$.

3. Method as defined in claim 2 wherein the write-in timing frequency for the memory circuit is entirely independent of the read-out timing frequency as regards frequency and synchronization, the read-out timing frequency is optimally adapted to the available devices utilized for compiling, evaluating, displaying and/or recording the measured values ($mi$), while the write-in timing frequency is oriented only to the conditions of the measured value compilation during the measuring periods ($Lm$).

4. The method as defined in claim 3 wherein the measuring period ($Lm$) and the display period ($Td$) are started independent of one another.

5. The method as defined in claim 1 wherein the sequence in which the display locations ($ld$) are available during the display period ($Td$) is reversed with respect to the sequence of the measuring intervals ($lm$) during the measuring period ($Lm$).

6. The method of claim 1 including the step of generating and recording an indication representative of the quality of the measured value information according to a given criterion stored in each address of the memory.

7. The method as defined in claim 6 wherein the repetition frequency of a measured value ($mi$) is used as the quality criterion and including the steps of: comparing each new measured value ($mi$) before it is written into the memory circuit, with the comparable measured value ($mi$) stored therein; and, in the event of coincidence within a given tolerance range (tol) between the compared values, changing the value of the indications representative of the quality of the measured value information (hereinafter referred to as the comparison value signal $Il$) stored in the memory to an upgraded value which, compared to the previously available value, represents, per definition, an improved value.

8. The method as defined in claim 7 wherein new measured values ($mi$) which do not coincide, within a given tolerance range (tol), with already stored older measured values ($mi$) are written into an available free location in the memory and are provided with a minimum comparison value signal ($Il$min).

9. The method as defined in claim 8 wherein new measured values ($mi$) are compared with previously recorded measured values ($mi$) which appeared in the preceding adjacent measuring period ($Lm$) for the same position identifying values ($Mi$).

10. The method as defined in claim 8 wherein new measured values ($mi$) are compared with previously recorded measured values ($mi$) which appeared in the same measuring period ($Lm$) but for the previous position identifying value ($Mi-1$).

11. The method as defined in claim 8 wherein each new measured value ($mi$) is compared only for coincidence within the given tolerance range (tol) with any measured value ($mi$) already stored in the memory.

12. The method as defined in claim 6 wherein, in the event of coincidence, within a given tolerance range (tol) between an older stored measured value ($mi$) and a newer measured value ($mi$), in addition to upgrading the comparison value ($Il$), the older stored measured value ($mi$) is upgraded by writing the newer measured value in the associated memory address location in place of the older previously stored measured value.

13. The method as defined in claim 12 wherein stored measured values ($mi$) which are already associated with a given optimum comparison value ($Il$opt) are no longer upgraded when a new confirmation by new measured values ($mi$) occurs within the given tolerance range (tol).

14. The method as defined in claim 13 including, during the writing of information into the memory, providing and storing a marker ($n$) for each memory location in which a measured value ($mi$) from measuring period ($Lm$) being processed has been written.

15. The method as defined in claim 14 wherein, after the measured values ($mi$) in all of the memory locations of the memory have been tested for comparison with measured values ($mi$) determined in a measuring period ($Lm$) and before the initiation of the processing of new measured values from a measuring period ($Lm+1$): each comparison value ($Il$) associated with a memory location not provided with a marker ($n$) is reduced in value by one unit, and all of the information, e.g. measured value ($mi$) and comparison value ($Il$), in each memory location which is provided with a comparison value ($Il$) which corresponds to the minimum comparison value ($Il$min) and does not have a marker ($n$) is erased so that from now on the respective memory location is available for new measured values ($mi$), and each of the markers ($n$) is erased.

16. The method as defined in claim 7 wherein the new measured value is written into a memory location of the memory when coincidence occurs between an older stored measured value and a new measured value ($mi$), and measured values ($mi$) of consecutive measuring periods ($Lm$) which coincide a predetermined number of times are erased.

17. The method as defined in claim 7 wherein: during the read out of the memory in a display period ($Td$), the comparison values ($Il$) are detected and only measured values ($mi$) stored in the memory circuit which are associated with a predetermined optimum comparison value ($Il$opt) obtained from a sufficient number of repeated confirmations of successively arriving comparable measured values ($mi$) are read out upon comparison of the values DK and $Mi$, so that the reading out of a particular measuring value ($mi$) when the display marker implement has reached that display section ($ld$) within the display range ($Ld$) which, with the given display scale, represents a true-to-scale representation of the present measured value ($mi$) without there existing a direct connection with the preceding process of compiling the measured values.

18. The method as defined in claim 2 wherein the entire course of the measured values ($mi$) is quantized over the independent variable (P) for each measuring period ($Lm$) and the measured values ($mi$) are written into the memory utilizing the running time values ($Mi$) as address values.

19. The method as defined in claim 2 wherein only the portion of the course of the measured values ($mi$) which is of interest is quantized over the independent variable (P) for each measuring period ($Lm$) and the measured values ($mi$) are written into the memory utilizing the running time values ($Mi$) as address values, and wherein the running time values defining the beginning and the end of the course portion of interest are simultaneously written into the memory with the associated measured value ($mi$) as auxiliary data ($Zi$).

20. The method as defined in claim 19 wherein only the running time values defining the beginning and end of each succession of measured values ($mi$) of interest within one measuring period ($Lm$) are written into the memory.

21. The method as defined in claim 18 wherein only the running time value ($Mi$) at the first appearance of a typical event is considered as the applicable measured value ($mi$) for each measuring period ($Lm$).

22. The method as defined in claim 2 wherein in order to provide for a variation of range and/or scale of the display of the measured values ($mi$) within the display range ($Ld$), a selectable number of running-time values ($Mi$) is associated to a selectable number of display location values (DK) which represent the respective available display range ($Ld$).

23. The method as defined in claim 22 wherein with a constant quantization of the measuring period ($Lm$) and of the display period ($Td$) in scale and/or range the variation is accomplished by varying the association required between the values $Mi$ and DK for read-out and display by means of a switchable digit comparator.

24. The method as defined in claim 22 wherein the variation in scale and/or measuring range is accomplished by varying the measuring timing frequency, and thus the timing of the quantization of the measuring period ($Lm$) while maintaining a constant read-out timing frequency, and thus constant quantization of the display range ($Ld$), and the same association between the values $Mi$ and DK.

25. The method as defined in claim 22 wherein the measuring timing frequency is not constant during a measuring period ($Lm$).

26. The method as defined in claim 25 wherein the measuring timing frequency varies at a logarithmically decreasing frequency.

27. The method as defined in claim 1 wherein the steps of writing the measured values ($mi$) into the memory and of reading out the measured value ($mi$) for reproduction, occur in an alternating sequence, and wherein the reading-out of the measured values ($mi$) from the memory circuit is rigidly coupled with the reproduction along the display range ($Ld$).

28. The method as defined in claim 1 wherein the method is utilized on a surveying vessel for measuring, compiling and reproducing measured values in an echo sounding arrangement, and wherein the quantization density of the measuring period ($Lm$), i.e. the number of measuring intervals ($lm$), is varied in a sense opposite to the momentary lifting movement of the surveying vessel.

29. Apparatus for compiling, evaluating, displaying and/or recording, preferably for displaying and/or recording in the form of a columnar arrangement, measured values ($mi$) obtained during a measuring period ($Lm$) within a sequence of measuring periods and dependent on a given independent variable ($P$), wherein the measuring period ($Lm$) and the displaying and/or recording period (hereinafter uniformly called the display period $Td$) take place independent of one another, so that the display and/or recording can take place, if required, at another location and at another time than where the measured values were compiled, comprising: means for quantizing the independent variable ($P$) of the measuring period ($Lm$) and providing a running time digital identifying value ($Mi$, where $i = 0-p$) for each of the resulting measuring intervals ($lm$); means for quantizing the measured values ($mi$) of a measuring period ($Lm$) which has been started at any desired point in time with respect to the momentary conditions of a display period ($Td$); means for writing the quantized measured values ($mi$) from each measuring period ($Lm$) into a memory circuit utilizing the identifying values $Mi$ as memory address values ($Ai$); display means; means for quantizing a given display range ($Ld$) of said display means providing a digital and display location value ($DK$, where $K = 0-q$) for each of the resulting display sections ($ld$); means for comparing each consecutive digital display location value $DK$ occurring during a display period ($Td$) started at any desired point in time with respect to the momentary conditions of a measuring period ($Lm$); with the identifying values $Mi$ stored in said memory circuit and for providing an output signal whenever a predetermined association exists between a value $Dk$ and the single value $Mi$ corresponding thereto; and read-out means, responsive to the output signals from said means for comparing, for reading out the information stored in the memory location having the memory address corresponding to the just compared digital value $Mi$ and for transmitting the read-out information to said display means for display in the associated display location ($ld$).

30. The apparatus as defined in claim 29 including a control clock pulse generator; and wherein said memory circuit comprises a closed ring-type shift register having a number of shift stages at least equal to the maximum number of identifying values ($Mi$) i.e., the number of measuring intervals ($lm$) occurring within one measuring period ($Lm$), the timing of said shift register being controlled by the clock pulses from said clock pulse generator.

31. The apparatus as defined in claim 30 wherein said display means includes drive means for moving the marking means of said display means in a uniform manner over the display range in the direction of the recording of the measured values ($mi$) of a measuring period ($Lm$); and wherein said means for quantizing a given display range includes means for emitting a series of display location pulses ($ld$) whose number corresponds to the momentary position of said marking means within said display range, and a digital counter for counting said display location pulses and whose count represents the display location values $DK$.

32. The apparatus as defined in claim 31 wherein said display means is a conventional recorder having drive means mechanically coupled to a writing stylus which serves as said marking means, said stylus being coupled to said means for emitting a series of display location pulses.

33. The apparatus defined in claim 32 wherein said drive means for said writing stylus is a motor which when actuated advances said stylus in a continuous manner over said display range; and wherein said means for emitting a series of display location pulses comprises a pulse disc connected to the motor shaft for rotation therewith and a stationary pick-off.

34. The apparatus as defined in claim 32 wherein said means for emitting a series of display location pulses is an electronic location pulse generator; and wherein said drive means for said writing stylus is a stepping motor, said stepping motor being excited by the output pulses of said location pulse generator.

35. The apparatus as defined in claim 31, including a freely running clock pulse generator for providing a series of central control clock pulses said control clock pulses simultaneously determining the write-in timing for said memory circuit and effecting the quantization of the measuring period ($Lm$).

36. The apparatus as defined in claim 35 wherein said freely running clock pulse generator provides said central control clock pulses at a constant repetition frequency; wherein said means for quantizing the independent variable of the measuring period ($Lm$) includes a second digital counter responsive to said central control clock pulses for counting same to provide said values $Mi$ and means for resetting and releasing said second digital counter at the beginning of each measuring period; and wherein said means for comparing the display location values $DK$ and the identifying values $Mi$ comprises at least one translator operating as a digital number comparator.

37. The apparatus as defined in claim 36 wherein said translator is a binary-decimally operating digital number comparator circuit.

38. The apparatus as defined in claim 36 including means for varying the predetermined association between said values $Mi$ and $DK$ at which said means for comparing emits an output signal, whereby the scale and/or range of the display may be controlled.

39. The apparatus defined in claim 36, including an adjustable pulse frequency divider connected between the output of said freely running clock pulse generator and the input of said second digital counter, whereby the scale of the display may be varied by changing the frequency of the pulses counted by said second digital counter and without any change in the mode of operation of said translator.

40. The apparatus defined in claim 36 including pulse frequency reducing means connected between the output of said freely running clock pulse generator and the input of said second digital counter for cutting out individual pulses of said series of central control clock pulses at a logarithmically increasing rate, whereby a logarithmic display can be presented without any change in the mode of operation of said translator.

41. The apparatus as defined in claim 36 including preprogrammed circuitry means for varying the scale of the display by varying the relationship between the digital values DK and M$i$.

42. The apparatus defined in claim 41 including circuit means responsive to the measured value information for stopping the counting of said second digital counter during a measuring period.

43. The apparatus defined in claim 42 wherein said apparatus is utilized in an echo sounding system and wherein said circuit means for stopping the counting of said digital counter is connected to the receiver amplifier of said system and is responsive to a received bottom echo signal (B$e$) to stop said counter, whereby the value M$i$ in said counter also serves as the measured value $mi$.

44. The apparatus defined in claim 43 wherein said circuit means for stopping the counting of said second digital counter includes: a gate connected between the output of said freely running clock pulse generator and the input of said second digital counter; and switch means for controlling said gate to selectively cause the stopping of the counting of said second digital counter either upon the receipt of said bottom echo signal or upon the output of said second digital counter reaching a predetermined count.

45. The apparatus of claim 44 wherein said switch means automatically causes the resetting and the releasing of said second digital counter to begin a new measuring period after transfer of the value M$i$ into said memory circuit.

46. The apparatus of claim 43 further comprising means including an integrating and threshold value circuit for controlling the amplification factor of said receiving amplifier in accordance with the momentary occupation density of the memory location of said memory circuit.

47. The apparatus defined in claim 31 including auxiliary data input means for supplying digitally coded auxiliary data (Z$i$) associated with the measured values ($mi$) to the input of said memory circuit for storage therein together with the associated measured values.

48. The apparatus as defined in claim 32 wherein said recorder is an echograph with a rotating stylus band on which said writing stylus is connected, and wherein said stylus band includes said means for emitting said series of display location pulses (I$d$).

49. Apparatus as defined in claim 30 wherein said means for quantizing a given display period comprises means coupled to the said writing means and responsive to the relative position thereto for directly emitting coded position-dependent display location parameters (DK).

50. The apparatus defined in claim 31 wherein each measured value stored in the memory location is provided with an additional indication representative of the quality of the stored data; and wherein said apparatus further includes: means for comparing each new measured value ($mi$), before it is written into the memory circuit, with the comparable measured value ($mi$) stored therein, and (1) in the event of coincidence within a given tolerance range (tol) between the compared values, changing the value of the indications representative of the quality of the measured value information (hereinafter referred to as the comparison value signal I$l$) stored in the memory to an upgraded value, and (2) in the event of no coincidence within a given tolerance range (tol) between the compared values, causing the new measured value to be stored in an available free location in said memory circuit with a minimum comparison value (I$l$min).

51. The apparatus defined in claim 50 wherein said means for comparing each new measured value before it is written into the memory circuit includes: a digital comparator means having one input connected to the read-out access of said memory circuit, wherein the data is being continuously shifted in a rapid sequence, and a second input connected in the input path for the input data to the memory circuit; an adjustable tolerance signal generating means connected to a further input of said digital comparator means for setting the coincidence tolerance range, said comparator means having a first output connected to the write-in access of said memory circuit and a second output, said comparator means providing an output signal at said second output whenever information is to be written into the particular memory location then present at read-out access of said memory means; and an evaluator circuit, having one input connected to said second output of said comparator means, and a second input connected to said memory means so as to read the stored comparison value signals (I$l$), said evaluator circuit being responsive to a signal at said one input thereof to upgrade the value of the comparison value signal being read and change the value thereof in the memory circuit location.

52. The apparatus of claim 51 wherein upon coincidence between two compared values, said comparator means causes the new measured value to be written into the memory circuit in place of the previously stored value.

53. The apparatus of claim 51 wherein said evaluator means is a forward and backward counting circuit and wherein said evaluator means causes a marker ($n$) to be stored in each memory location in which information for the measuring period (L$m$) being processed is written and said marker to be erased during a subsequent cycle of the data in said memory circuit before the measured information from the next measuring period (L$m$+1) is processed; and wherein said apparatus further includes a cleaning circuit means which is responsive to said stored markers during said subsequent cycle for causing said evaluator means to downgrade the comparison value signal (I$l$) associated with each memory location not provided with a marker ($n$).

54. The apparatus defined in claim 53 wherein said evaluator means is a forward and backward counting counter circuit according to the Gray code for numerical values between 0 and 3 for the comparison values ($Il$).

55. The apparatus defined in claim 53 including a transfer circuit and at least one intermediate memory connected in series between said second input of said comparator means and the data inputs for the information to be stored, each intermediate memory having a number of flipflop stages corresponding to the maximum number of bits for the total input data ($mi$, $Mi$, $Zi$) to be stored in a memory location once per measuring period ($Lm$).

56. The apparatus defined in claim 50 including means for passing only stored values of $Mi$ which are associated in the memory with an optimum comparison value ($Ilopt$) to said means for comparing each consecutive digital location value DK with the identifying values $Mi$ during a display period.

57. The apparatus defined in claim 31 wherein said drive means for said display means has its sequence of movement selected so that said marking means is disposed within one display section ($ld$) at least during one cycle of the information ($mi$, $Zi$) through said memory circuit.

58. The apparatus defined in claim 36 wherein said drive means for said display means has its sequence of movement selected so that said marking means is disposed within one display section ($ld$) at least during one cycle of the information ($mi$, $Zi$) through said memory circuit; and wherein the said read-out means includes a gate responsive to an output signal from said translator, and a digital/analog converter for converting the digital signals read out of said memory circuit to analog signals for display.

59. The apparatus defined in claim 58 wherein said digital/analog converter comprises a writing voltage source, the output value of which controls the intensity of the display mark representing the measured value.

60. The apparatus defined in claim 59 wherein the information being measured is the time for the return of the echo of a transmitted pulse; wherein said display means is a recording echograph and wherein the output signal of said writing voltage source is connected via said gate to the contact rail for the writing stylus of said echograph to provide a mark at the appropriate display location.

61. The apparatus defined in claim 39 wherein said second digital counter is a combination of a primary counter and a carry counter connected thereto which has a lesser number of bit locations than said primary counter, said primary and carry counters having parallel outputs.

62. The apparatus defined in claim 61 wherein said primary counter has a number of stages sufficient to count a fraction of the values $Mi$ of a measuring period $Lm$, measured by the quantization into measuring intervals corresponding to the desired resolution, and said primary counter starting its count over again during a measuring period ($Lm$) each time a carry pulse ($Ic$) has been transmitted to the carry counter.

63. The apparatus defined in claim 62 further including a digital comparator means having one input connected to the parallel outputs of said primary counter and a second input connected to said memory for comparing each new measured value obtained during a measuring period ($Lm$) with a corresponding value previously stored in said memory circuit, and for causing values for which no coincidence occurs to be written in a new location of said memory circuit; a partial section signal generating means for selectively providing a digital signal, which is coded in the same code as the digital code utilized in said primary and carry counters, having a value representative of a selected partial section of the measuring period ($Lm$); signal inverting means having parallel outputs and its input connected to the output of said partial section signal generating means; a digital adder for adding each of the outputs of said inverting means, with the exception of the output representing the lowest order bit, with the corresponding output of said carry counter; and an AND gate having its inputs connected to the outputs of said adder and its output connected to an enabling input of said comparator, whereby only measured values occurring within the selected partial section of the measuring period will be compared and stored.

64. The apparatus defined in claim 63 wherein said adder is provided with an additional adder stage the output of which is connected to said comparator and represents the highest order bit of said primary counter, the inputs of said additional adder stage being connected to the output of said inverting means representing the lowest order bit and the output of said primary counter representing the highest order digit, whereby the output of said primary counter representing the highest order digit is not directly coupled to said comparator means bit only via said additional adder stage.

65. Apparatus as defined in claim 63 wherein said carry counter is provided, in addition to the number of bit locations required to count out the partial sections of the entire measuring period, with a further, highest-value bit location for producing a final carry pulse ($Icc1$) at the output thereof after passage of the last partial section of the measuring period ($Lm$); and further including switching circuit means responsive to an input signal thereto for stopping and resetting said primary and carry counters, said output of said highest-value bit location of said carry counter being coupled to the input of said switching circuit means.

66. The apparatus defined in claim 65 wherein said output of said highest-value bit location of said carry counter is connected with the input of said switching circuit means via an OR gate; wherein said adder provides a carry pulse ($Icc2$) at a carry output at the end of a partial section selected by means of the signal from said partial section signal generator; and wherein said carry output of said adder is connected to the other input of said OR gate.

67. The apparatus defined in claim 58 including a range marker signal generating means, the output of said range marker signal generating means being coupled to said marking means via said gate to cause an indication representative of the particular display range being utilized to appear in the display.

68. The apparatus defined in claim 63 including a range marker signal generating means, the output of said range marker signal generating means being coupled to said marking means via said gate to cause an indication representative of the particular display range being utilized to appear in the display; and wherein said range marker signal generating means has its input coupled to the output of said partial section signal generating means, whereby said range marker signal generating means automatically causes an indication of the selected partial section of the measuring period.

69. The apparatus defined in claim 68 including a blocking key for temporarily blocking the function of said range marker signal generating means during a display period.

70. The apparatus defined in claim 47 wherein said apparatus is utilized for measuring the returned echoes of transmitted signals; wherein said auxiliary data input means includes a fundamental frequency discriminator which is connected between the output of an echo signal receiver and the input of an auxiliary data signal generating means for providing auxiliary data signals to identify different frequency based measured values ($mi$) and to identify measured values ($mi$) which have different fundamental frequencies in their bottom echo signals ($Be, Be1, ...$).

71. The apparatus defined in claim 59 wherein said apparatus is utilized in an echo sounding system; wherein said gate has a bistable characteristic; and further including a backward counting digital counter means for storing a value representative of the return echo time; means for supplying said backward counting digital counter means with said value representative of the return echo time at the beginning of a display period; said backward counting digital counter means being responsive to the output signal from said translator to close said gate and to begin its backward count, and to open said gate when it has counted out the value momentarily stored therein.

72. The apparatus defined in claim 71 wherein said means for supplying said backward counting digital counter means includes a further digital counter means for counting the pulses from said free running control clock pulse generator, and means for stopping the count of said further digital counter upon receipt of a returned echo pulse whereby the value stored in said further digital counter is the measured value ($mi$).

73. The apparatus defined in claim 59, including an amplitude coder means for providing a coded output signal proportional to the amplitude of a measured value input signal to said apparatus; and wherein said writing voltage source is responsive to the output signal from said amplitude coder means to vary the intensity of the output thereof.

74. The apparatus defined in claim 39 wherein said apparatus is utilized in an echo sounding system; wherein the value M$i$ present in said second digital counter at the time of receipt of an echo from a transmitted signal is the measured value ($mi$); and wherein an adjustable range preselector means is provided for furnishing a digital value equal to a preselected starting identifying value (M$a$) at the beginning of each measuring period (L$m$); and means for transferring said value M$a$ to said second digital counter at the beginning of each measuring period.

75. The apparatus defined in claim 39 wherein said apparatus is utilized in an echo sounding system; wherein the transmission of a signal by means of a signal transmitter initiates the measuring period (L$m$) and the starting of the counting by said second digital counter; wherein the value in said second digital counter upon receipt of an echo of a transmitted signal is proportional to the travel time of said transmitted signal; and wherein said apparatus further includes means for triggering said signal transmitter whenever said second counter reaches a predetermined count following the beginning of a measuring period (L$m$).

76. The apparatus defined in claim 31 wherein said apparatus is utilized in an echo sounding system on a surveying vessel; wherein the transmission of a signal by means of a signal transmitter initiates the measuring period (L$m$) and the starting of the counting by said second digital counter; wherein the value in said second digital counter upon receipt of an echo of a transmitted signal is proportional to the travel time of said transmitted signal; and wherein said apparatus further includes means for triggering said signal transmitter in accordance with the environmental conditions on said surveying vessel to provide optimum conditions for the transmission.

77. The apparatus defined in claim 76 wherein said means for triggering said signal transmitter comprises an inclinometer.

78. The apparatus defined in claim 76 wherein said means for triggering said signal transmitter comprises a lift accelerometer for said surveying vessel.

79. The apparatus defined in claim 31 wherein said apparatus is utilized in an echo sounding system on board a surveying vessel; wherein said display means is an echograph having a marking means in the form of a writing stylus which traverses the record on said echograph in a uniform manner and transverse to the longitudinal direction of said record; and wherein said apparatus further includes a first transmitting means for echo soundings in shallow water; a stylus end of travel contact means on said echograph for producing a signal when said writing stylus has reached the end of a display range during each display period, said first transmitting means being responsive to the signal produced by said end of travel contact means to transmit a signal; a first receiver for the echoes of signals transmitted by said first transmitting means, the output of said first receiver being coupled to the input of said memory circuit for storing the received bottom echo signals in timed sequence in adjacent memory locations; and a start of travel contact means on said echograph for producing a signal when said writing stylus begins its travel over the display range at the beginning of each display period, said read-out means being responsive to the signal from said start of travel contact means to read out the information stored in said memory circuit and feed the same to said writing stylus, whereby the speed of the drive means for said writing stylus may be set at an optimum fast speed for displaying information from shallow water echo soundings.

80. The apparatus defined in claim 79 including: a second transmitter means and a second receiver means for deep water echo soundings; and an operational mode switch for selectively disconnecting said end of travel contact means and said start of travel contact means from said first transmitter means and the output of said memory circuit, respectively, and for connecting said start of travel contact means to said second transmitter means and the output of said second receiving means to said writing stylus.

81. The apparatus defined in claim 80 including an analog/digital converter connected between the input of said memory and the output of said first transmitter means and a digital/analog converter connected between the output of said memory circuit and said operational mode switch.

82. The apparatus defined in claim 79 wherein said memory circuit has a reversible timing direction.

* * * * *